US009621085B2

(12) United States Patent
Li et al.

(10) Patent No.: US 9,621,085 B2
(45) Date of Patent: Apr. 11, 2017

(54) THRUST COMPENSATION SYSTEM OF DUAL-WINDING VOICE COIL MOTOR

(71) Applicant: Harbin Institute Of Technology, Harbin (CN)

(72) Inventors: Liyi Li, Harbin (CN); Donghua Pan, Harbin (CN); Qingbo Guo, Harbin (CN); Mingyl Wang, Harbin (CN); Siya Xiong, Harbin (CN)

(73) Assignee: HARBIN INSTITUTE OF TECHNOLOGY, Harbin (CN)

( * ) Notice: Subject to any disclaimer, the term of this patent is extended or adjusted under 35 U.S.C. 154(b) by 0 days.

(21) Appl. No.: 15/023,403

(22) PCT Filed: Sep. 9, 2014

(86) PCT No.: PCT/CN2014/086141
§ 371 (c)(1),
(2) Date: Mar. 20, 2016

(87) PCT Pub. No.: WO2015/043375
PCT Pub. Date: Apr. 2, 2015

(65) Prior Publication Data
US 2016/0211783 A1    Jul. 21, 2016

(30) Foreign Application Priority Data

Sep. 30, 2013    (CN) .......................... 2013 1 0460563

(51) Int. Cl.
*H02P 7/025* (2016.01)
*H01F 7/06* (2006.01)
(Continued)

(52) U.S. Cl.
CPC ............. *H02P 7/025* (2016.02); *H01F 7/066* (2013.01); *H01F 7/128* (2013.01); *H02P 7/04* (2016.02); *H02P 25/034* (2016.02)

(58) Field of Classification Search
CPC .......... H02P 7/025; H02P 7/04; H02P 25/034; H01F 7/066; H01F 7/128
(Continued)

(56) References Cited

U.S. PATENT DOCUMENTS 4,967,293 A  * 10/1990 Aruga .................. G11B 5/5565
                                                       360/246.7
5,032,776 A  *  7/1991 Garagnon .............. G11B 5/553
                                                       318/611
(Continued)

FOREIGN PATENT DOCUMENTS

CN          2481042 Y       3/2002
CN        101404438 A       4/2009
CN        103607150 A       2/2014

OTHER PUBLICATIONS

The International Search Report and Written Opinion of related PCT Application No. PCT/CN2014/086141, mailing date Dec. 5, 2014.

*Primary Examiner* — Rita Leykin
(74) *Attorney, Agent, or Firm* — Troutman Sanders LLP; Ryan A. Schneider; Christopher C. Close, Jr.

(57) ABSTRACT

A thrust compensation system of a dual-winding voice coil motor, which is used for driving the voice coil motor having secondary windings arranged between each pair of main windings, wherein the main windings are the main working windings of the voice coil motor and used for providing the output electromagnetic force required by the driving system of the voice coil motor; the secondary windings are compensation windings and used for providing the thrust ripple opposite to the main windings and compensating the thrust ripple of the main windings, so that the resultant force of the output thrust of the main windings and the secondary windings of the voice coil motor is constant. The scheme provided by this invention not only greatly reduces the thrust
(Continued)

ripple of the servo system of the voice coil motor, but also realizes the ultra-high precision control of the servo drive system of the voice coil motor when the system is under low switching frequency, improves the stability of the system, reduces the system loss, and greatly reduces the cost of the drive controller.

13 Claims, 17 Drawing Sheets

(51) Int. Cl.
    *H01F 7/128*     (2006.01)
    *H02P 7/03*     (2016.01)
    *H02P 25/034*     (2016.01)

(58) Field of Classification Search
    USPC ..... 318/135, 115, 687, 671, 686; 310/12.24,
                  310/12.01, 12.15, 12.09, 12.16, 12.17;
                  360/264.7; 335/126, 149, 147
    See application file for complete search history.

(56) References Cited

U.S. PATENT DOCUMENTS

| | | | | |
|---|---|---|---|---|
| 5,245,232 A * | 9/1993 | Nihei | ............... | G11B 7/08582 310/12.08 |
| 5,325,247 A * | 6/1994 | Ehrlich | ............. | G11B 5/59622 318/611 |
| 5,606,468 A * | 2/1997 | Kodama | ........... | G11B 5/59616 360/137 |
| 5,612,833 A * | 3/1997 | Yarmchuk | ........... | G11B 5/5534 360/29 |
| 5,654,840 A * | 8/1997 | Patton | ............... | G11B 5/59694 318/601 |
| 5,663,847 A * | 9/1997 | Abramovitch | ......... | G01P 15/08 360/75 |
| 6,011,373 A * | 1/2000 | McConnell | ............. | G05B 5/01 318/560 |
| 6,101,062 A * | 8/2000 | Jen | ...................... | G11B 5/5582 360/75 |
| 6,144,181 A * | 11/2000 | Rehm | ..................... | G05B 5/01 318/609 |
| 6,624,720 B1 * | 9/2003 | Allison | .................. | H01P 1/127 333/105 |
| 6,643,080 B1 * | 11/2003 | Goodner, III | .......... | G11B 21/02 360/31 |
| 6,674,601 B1 * | 1/2004 | Ho | ......................... | G11B 21/02 360/75 |
| 6,707,269 B2 * | 3/2004 | Tieu | ....................... | H02P 6/085 318/592 |
| 6,735,038 B2 * | 5/2004 | Hill | ....................... | H02P 25/034 318/560 |
| 6,765,749 B2 * | 7/2004 | Galloway | ......... | G11B 5/59605 360/77.02 |
| 6,771,455 B1 * | 8/2004 | Yatsu | ................... | G11B 5/5526 360/75 |
| 7,209,311 B2 * | 4/2007 | Ueda | ..................... | G11B 5/596 360/77.06 |
| 7,474,494 B2 * | 1/2009 | Atsumi | ............. | G11B 5/59605 360/77.02 |
| 7,619,844 B1 * | 11/2009 | Bennett | ............... | G11B 5/5547 360/75 |
| 7,626,781 B2 * | 12/2009 | Konishi | ............... | G11B 5/5582 360/77.02 |
| 7,679,856 B2 * | 3/2010 | Ishiguro | .............. | G11B 5/5582 360/75 |
| 7,723,937 B2 * | 5/2010 | Kurosawa | .......... | G11B 19/2054 318/400.32 |
| 8,134,437 B2 * | 3/2012 | Brooks | ................ | H01F 7/1607 335/100 |
| 8,134,438 B2 * | 3/2012 | Brooks | ................ | H01F 7/1607 335/100 |
| 8,392,000 B2 * | 3/2013 | Levin | ............... | G05B 19/41835 455/73 |
| 8,860,338 B2 * | 10/2014 | Shimazaki | ........... | H02P 25/028 318/135 |
| 9,105,281 B2 * | 8/2015 | Kadlec | ............ | G11B 7/08529 |
| 9,401,168 B1 * | 7/2016 | Ito | ........................ | G11B 5/5552 |
| 2005/0111125 A1 * | 5/2005 | Chung | .................. | G01H 13/00 360/31 |
| 2011/0291495 A1 | 12/2011 | Lee et al. | | |

\* cited by examiner

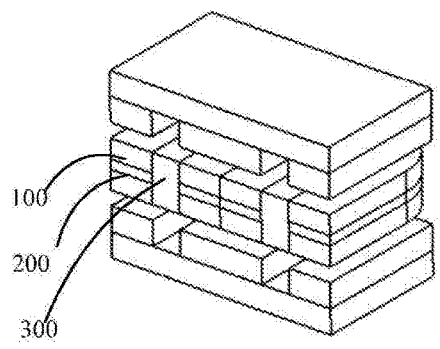
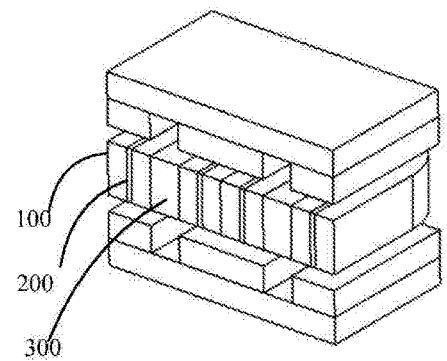
Fig. 5A Fig. 5B
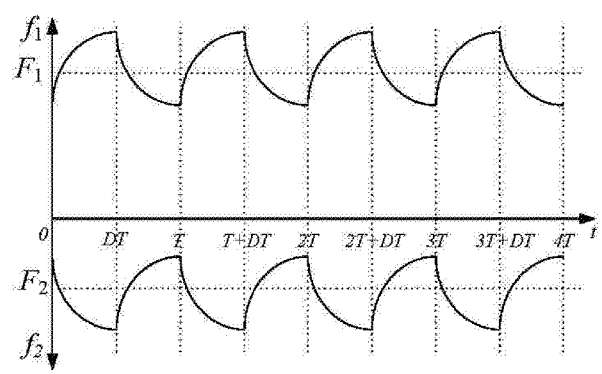
Fig. 6

THRUST COMPENSATION SYSTEM OF DUAL-WINDING VOICE COIL MOTOR

CROSS-REFERENCE TO RELATED APPLICATIONS

This application is a US National Stage of International Application No. PCT/CN2014/086141, filed 9 Sep. 2014, which claims the benefit of CN201310460563.4, filed 30 Sep. 2013, each herein fully incorporated by reference.

TECHNICAL FIELD

The invention relates to a voice coil motor, in particular to a drive control system of a voice coil motor having thrust compensation function.

BACKGROUND OF THE INVENTION

The voice coil motor (VCM) is a motor designed according to Lorentz force theory and used for directly switching the electrical signal into the beeline displacement without any intermediate switching mechanism. Compared with other motors, the voice coil motor has a plurality of advantages, such as simple structure, small volume, light weight, low inertia and larger than thrust, etc., so that it has broad application prospects, which is mainly applied to the positioning systems with high precision, high frequency excitation, speediness and high acceleration, optics and measurement systems, optical assembly and aviation.

At present, the design scheme of the servo drive controller of the voice coil motor in the ultra-high precision servo control field is divided into linear power amplifier scheme and PWM power converter scheme. When the ultra-high precision servo system adopts the linear power amplifier scheme to design, the current response is fast, the thrust ripple of the system produced by the on-off chopped wave of the switch is eliminated, and the stability of the output thrust is improved. But when the system adopts the linear power amplifier scheme, firstly the current response has overshoot problem and the nonlinear region while the current leaps. Secondly the design of the controller is greatly limited, and the high performance is difficult to control. When the ultra-high precision servo system adopts the linear power amplifier scheme to design, heat dissipated by the system components is large and more energy is lost. One of the important development directions of the ultra precision positioning servo system is high overload and high acceleration, undoubtedly the power grade requirement of the element is higher, so that the linear power amplifier scheme is increasingly difficult to meet the power requirements of the ultra-high precision servo control system.

But when the ultra-high precision servo system adopts the PWM power converter scheme to design, because the control signal of the system is controlled by a digital processing unit, the design of the control system of the servo control system of the voice coil motor is more flexible, the drive performance of the system can be controlled by using more complex control methods, at the same time, the system has the advantages of fast response speed and high efficiency. But the PWM power converter scheme has some shortcomings. Firstly because the on-off chopped wave of the switch inevitably produces the current ripple in the system, and then the thrust ripple (the thrust ripple produced by the on-off chopped wave of the switch in the system is generally called thrust ripple below) caused by the current ripple greatly influences the control performance of the servo drive control system of the ultra-high precision voice coil motor. Secondly when the system adopts the PWM power converter scheme, the dead time set for preventing the direct connection of the upper and lower bridge arms of the switch circuit causes the instability phenomenon in the drive system.

At present, to reduce the thrust ripple produced in the system in the PWM power converter scheme, the high switching-frequency drive method is accepted. For example, to reduce the thrust ripple, the designer ascends the switching frequency of the switch to 200 kHz, at the moment, compared with the 10 kHz switching frequency adopted by the drive control system of the traditional servo motor, the thrust ripple of the system is reduced to 5% of original, but at the same time, because the switching frequency of the switch is ascended 20 times from the original, the switching loss of the switch is ascended 20 times from the original, simultaneously because the switching frequency of the switch ascends, the requirements of the switch are improved, and the cost of the drive system is increased. If the switching frequency is ascended, the control difficulty of the control system and the design difficult of the drive circuit of the drive system rise, and the stability of the system is greatly reduced.

The research hotspots of the servo drive controller of the voice coil motor in the ultra-high precision servo control field focus on two directions, one is to improve the power grade and the response speed of the linear power amplifier so as to improve the better servo control performance of the system, and the other one is how to reduce the thrust ripple of the system in the PWM power converter scheme and improve the control performance of the system.

In accordance with the analysis above, when the servo control system of the voice coil motor adopts the PWM power converter scheme as shown in FIG. 24, because of the on-off chopped wave of the switch in the system, the current ripple is produced in the main windings, which causes the output thrust ripple of the servo system of the voice coil motor as shown in FIG. 23.

The traditional servo adopts the switching frequency below 10 kHz, the output thrust of the servo drive system of the voice coil motor is shown in FIG. 25A through FIG. 25C.

As shown in FIG. 25A through FIG. 25C, the servo system of the voice coil motor is in the small thrust output state, the range of the output thrust ripple of the system is 9.3398 N-3.3324 N, the average output thrust is 6.3361 N and the peak-to-peak value of the output thrust ripple is 6.0074 N.

In accordance with the current conventional method for solving the output thrust ripple of the system, when the switching frequency of the drive circuit of the system is increased to 200 kHz, the simulation waveform of the output thrust of the system is shown in FIG. 26A through FIG. 26C.

It is observed that the fluctuation range of the output thrust of the system is 6.9954 N-6.6935 N when the switching frequency of the drive circuit of the system is increased to 200 kHz, the peak-to-peak value of the output thrust ripple is 0.3019 N, and the output thrust ripple is reduced to 5% of original compared with the 10 kHz switching frequency.

SUMMARY OF THE INVENTION

Based on the influence of the system applied by the thrust ripple when the servo drive control system of the voice coil motor in the ultra-high precision servo control field adopts the PWM power converter control scheme, the following scheme is designed in this invention to effectively reduce the thrust ripple of the system by continuously improving the PWM switching frequency when the system adopts the PWM power converter control scheme, improve the working performance of the system, reduce the design difficulty of the drive circuit of the system and strengthen the stability of the system, and reduce the system loss.

The invention discloses a thrust compensation system of a dual-winding voice coil motor, including secondary windings arranged between each pair of main windings of the voice coil motor, wherein the main windings are the major working windings of the voice coil motor and used for providing the output electromagnetic force required by the driving system of the voice coil motor; the secondary windings are compensation windings and used for providing the thrust ripple opposite to the main windings and compensating the thrust ripple of the main windings so that the resultant force of the output thrust of the main windings and the secondary windings of the voice coil motor is constant.

Preferably the main windings are driven by the drive circuit of the main winging switch of which power is supplied by one or two independent controlled voltage sources.

Preferably the secondary windings are driven by the drive circuit of the secondary winging switch of which power is supplied by two independent controlled voltage sources.

Preferably the drive circuits of the main windings and the secondary windings are H-shaped full-bridge drive circuits.

Preferably the drive circuit of the secondary windings uses two independent controlled voltage sources, namely the second DC voltage source and the third DC voltage sources supply the power, the second DC voltage source and the third DC voltage source are obtained through the Buck DC chopper control circuit, the Boost DC chopper control circuit or the Buck-Boost chopper control circuit.

Preferably the main windings are driven by the drive circuits of the main winging switch of which power is supplied by two independent controlled voltage sources, and the power supply of the dual-power drive circuit of the main windings, namely the first DC voltage source and the fourth DC voltage source are obtained through the Buck DC chopper control circuit.

The scheme proposed in the invention not only greatly reduces the thrust ripple of the servo system of the voice coil motor, but also realizes the ultra-high precision control of the servo drive control system of the voice coil motor when the system is under the low switching frequency, improves the stability of the system, reduces the system loss, and greatly reduces the cost of the drive controller.

BRIEF DESCRIPTION OF THE DRAWINGS

FIG. 5A shows the relationship of the upper and lower winding method of the main windings and the secondary windings to the settings of the magnetic steel and the permanent magnet;

FIG. 5B shows the relationship of the internal and external winding method of the main windings and the secondary windings to the settings of the magnetic steel and the permanent magnet;

FIG. 6 is an output thrust compensation relationship view of the main windings and the secondary windings of a single power supply;

DESCRIPTION OF THE PREFERRED EMBODIMENT

To overcome the influence of the servo performance of the system caused by the thrust ripple produced when the servo drive control system of the voice coil motor in the current ultra-high precision servo control field adopts the PWM power converter scheme, a new voice motor structure and a corresponding drive control scheme of a servo drive control system are proposed in this invention.

In the invention, the technical scheme for solving the technical problems thereof is as follows: an auxiliary secondary compensation winding at the other side of the main winding of the voice coil motor, and then the secondary winding produces the thrust ripple completely opposite to the main winding, so that the thrust ripples produced by the main windings and the secondary windings of the voice coil motor can be canceled each other out through the secondary windings. In the PWM power converter scheme, the synthetic output thrust produced by the main windings and the secondary windings of the servo system of the voice coil motor is constant, so that the ultra-high precision servo control of the voice coil motor in the low switching frequency is realized, the flexibility of the system control is enhanced, the control system can use multiple complex intelligent control strategies, the control performance of the system is effectively improved, the stability of the drive control system is improved, and the cost of the drive controller is reduced.

Figure 1:
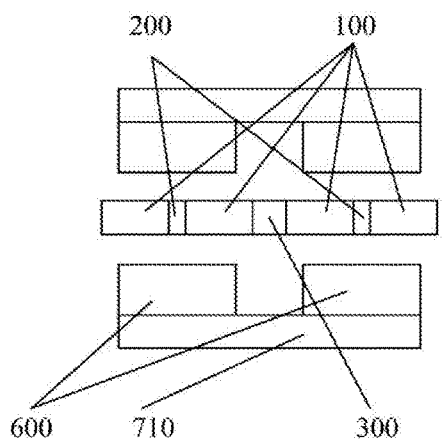
FIG. 1 is an antipode dual-winding voice coil motor.

FIG. 1 takes the antipode dual windings as example to show a structure diagram of the dual-winding voice coil motor in the invention. In the normal motor windings, the other set of windings are added to the main windings 100, namely the secondary windings 200, so that the amplitudes of the thrust change produced by the secondary windings 200 of the motor and the thrust ripple produced by the main windings 100 are the same and the directions are opposite, and then the thrust ripple of the motor is suppressed so that the system has higher positioning precision.

The distribution and the design of the main and secondary windings 100, 200 are related to the electrical time constant of each set of the windings required by the drive control system and the distribution of the air-gap field of the motor.

The winding method of the windings 100, 200 is divided into the layered type or the joint filling type. For example, FIG. 2A through FIG. 2D show the two structures of the layered type, wherein FIG. 2A and FIG. 2B are the layering schematic view of the internal and external layers of the main windings and the secondary windings, FIG. 2C and FIG. 2D are the layering schematic view of the upper and lower layers of the main windings and the secondary windings.

Figure 2C:
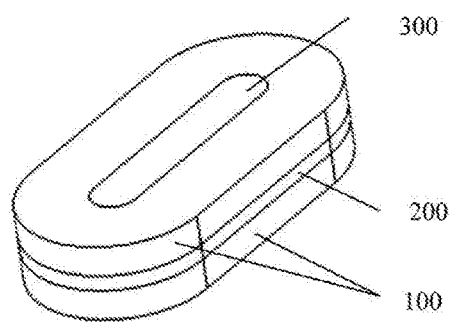
FIG. 2C is an upper and lower winding stereogram of the main windings and the secondary windings.
Figure 2A:
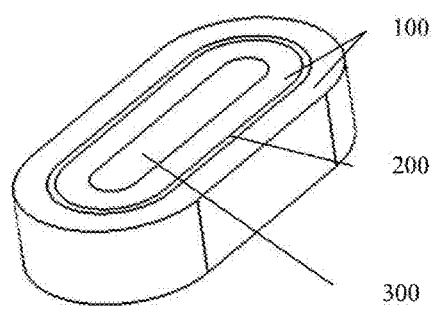
FIG. 2A is an internal and external winding of the main windings and the secondary windings.
Figure 2D:
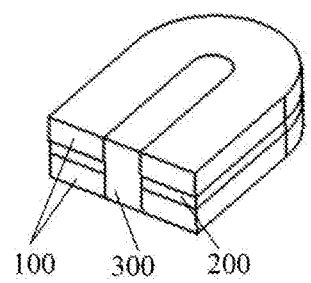
FIG. 2D is an upper and lower winding profile of the main windings and the secondary windings.
Figure 2B:
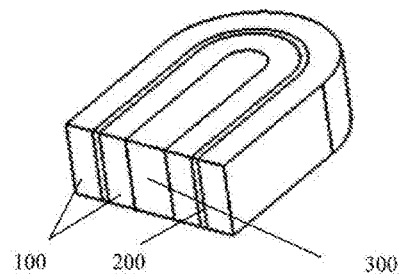
FIG. 2B is an internal and external winding profile of the main windings and the secondary windings.

As shown in FIG. 2A and FIG. 2B, the secondary windings 200 are enclosed between the two layers of the main windings 100, and the main windings at the internal side are enclosed on the external layer of the winging pillar 300.

As shown in FIG. 2C and FIG. 2D, the secondary windings 200 are clamped between the upper layer and the lower of the main windings 100, and the winging pillar 300 passes to the upper layer of the main winding, the secondary windings and the lower layer of the main winding from upside to downside.

Figure 3A:
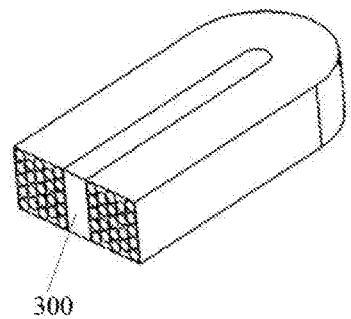
FIG. 3A through FIG. 3C show the winding method of the joint filling type main windings and secondary windings.
Figure 3B:
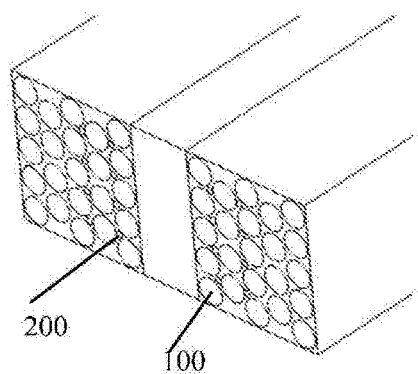
Figure 3C:
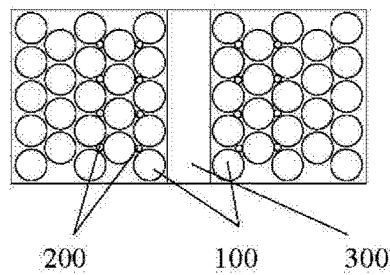

FIG. 3A through FIG. 3C show the winding method of the joint filling type main windings and secondary windings. In the special design requirements, the diameters of the enamelled wires of the secondary windings 200 are small, so the enamelled wires of the secondary windings 200 can be filled in the joints of the main windings 200.

Figure 4A:
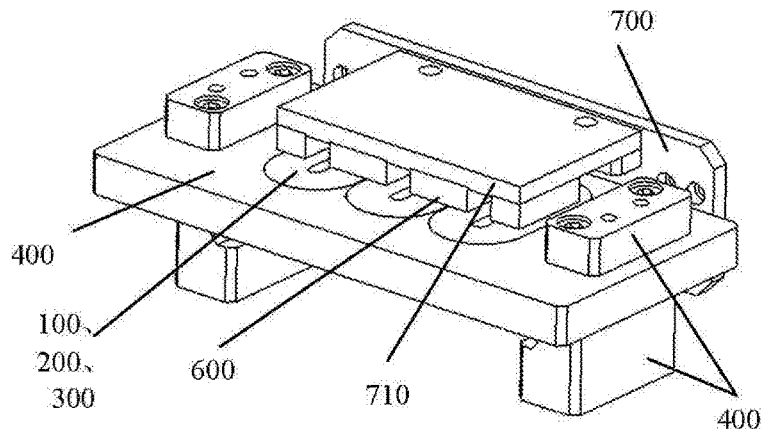
FIG. 4A is a schematic view of the multi-polar dual-winding voice coil motor.
Figure 4B:
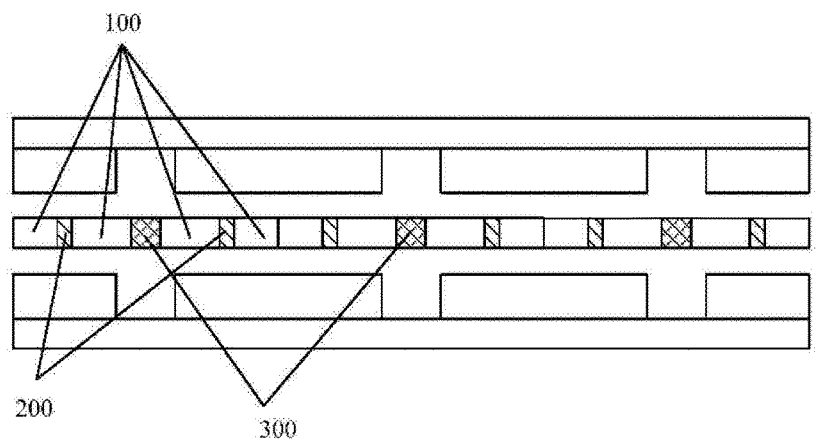
FIG. 4B is a schematic view of the multi-polar dual-winding voice coil motor.

FIG. 4A and FIG. 4B show a schematic diagram of the multi-polar dual-winding voice coil motor. The primary windings (100, 200, 300) of the motor are encapsulated in the primary support plate 400 through the epoxy glue, the primary support plate is supported through the primary support pedestal 500. The secondary magnetic steel 600 is connected with the secondary support structure 700 through the yoke plate 710. The structure above forms the complete structural style of the motor.

FIG. 5A and FIG. 5B respectively show the position relationship of the internal, external, upper and lower windings obtained by winding in layers in different forms to the magnetic steel and the permanent magnet.

Figure 9:
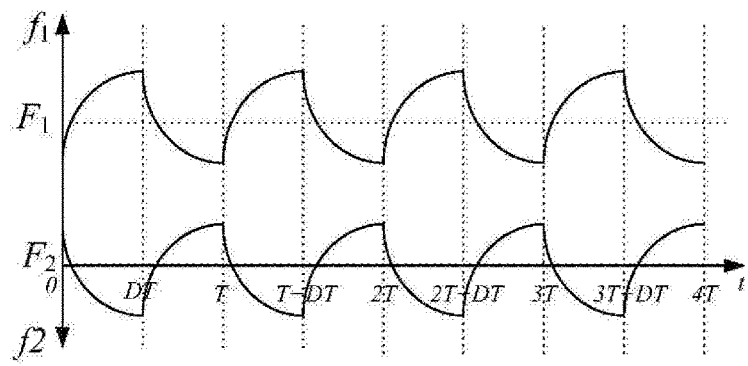
FIG. 9 is a schematic view of the thrust compensation effect of the dual-power thrust compensation system.

In the scheme of the invention, the secondary windings 200 are electrified after introduced to the voice coil motor so as to produce the thrust ripple opposite to the main windings 100, therefore the thrust ripple of the main windings can be compensated. The wavelength theory of the thrust ripple applied on the main windings 100 by the secondary windings 200 is shown in FIG. 9.

Next, the embodiments implementing the drive circuit of the dual-winding voice coil motor are described in details.

Embodiment 1

FIG. 6 is a thrust output compensation relationship view of the main windings and the secondary windings of a single power;

As shown in FIG. 6, in the thrust compensation of the main windings and the secondary windings of the single power supply, the output thrust ripple of the secondary windings can effectively reduce the thrust ripple produced by the main windings, but the average output thrust of the main windings are reduced while the secondary windings reduce the thrust ripple of the main windings, finally the average value of the output resultant force of the main windings and the secondary windings is reduced, and the output capability of the system is reduced. Because the output thrust of the secondary windings is proportional to the current of the secondary windings, the embodiment needs to reduce the average current of the secondary windings in the condition that the current change trends of the secondary windings are not changed.

Figure 7:
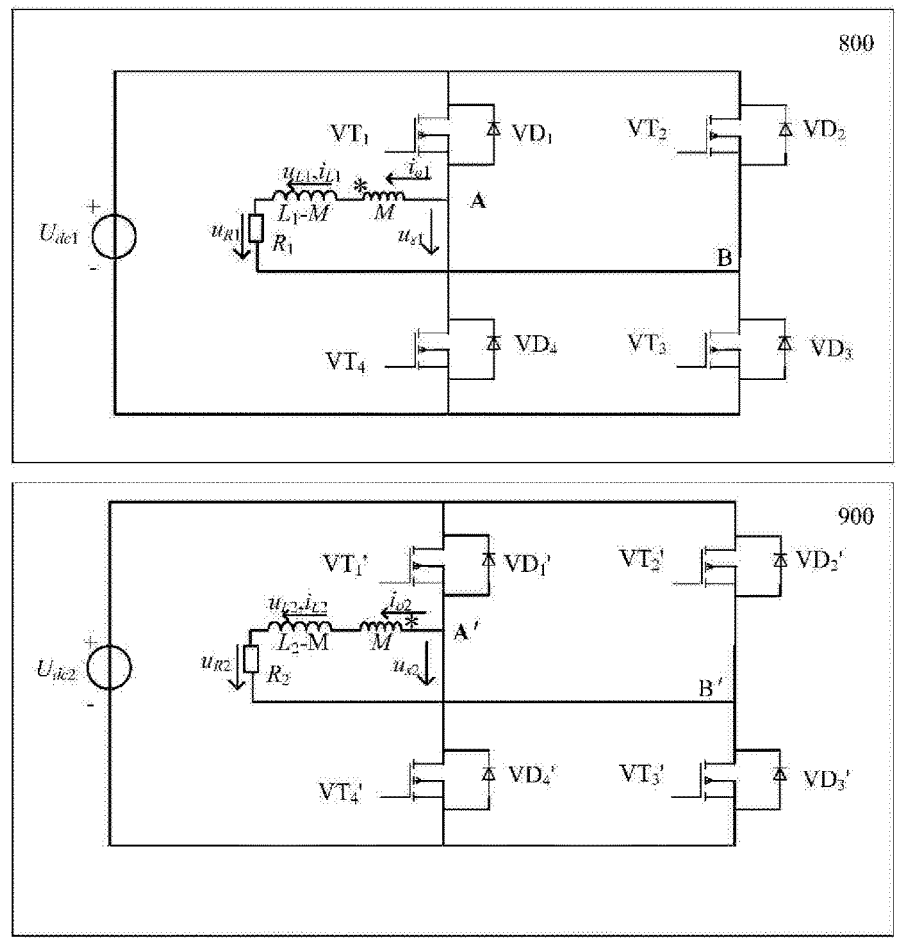
FIG. 7 is a schematic view of the thrust compensation system of the original single power supply.

After further analyzing the drive circuit of the secondary windings of the dual-winding thrust compensation system of the single power supply in FIG. 7, the average current of the secondary windings can be adopted as the combination of the average current within the switching-on period (namely VT1, VT3, VT1' and VT3' are switching-on signal, VT2, VT4, VT2' and VT4' are switching-off signal) and the average current within the switching-off period (namely VT1, VT3, VT1' and VT3' are switching-off signal, VT2, VT4, VT2' and VT4' are switching-on signal), if different DC-side voltages can be used within the switching-on period and the switching-off period, the purpose to adjust the average output current of the secondary windings can be realized by combining the average current in different forms within the switching-on period and the switching-off period.

Figure 8:
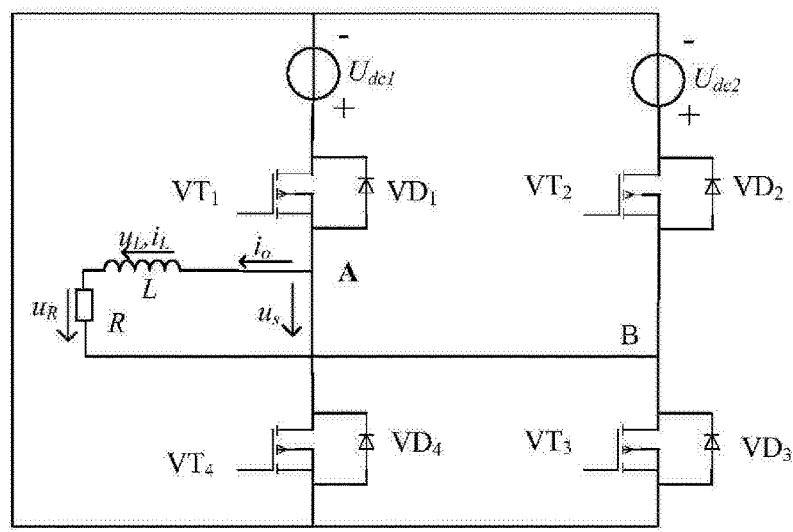
FIG. 8 is a structure sketch of the dual-power full-bridge drive circuit.

So if the two voltage sources respectively adopt the different voltages $U_{dc1}$ and $U_{dc2}$ as shown in FIG. 8, the circuit can use the different DC-side voltages in the switching-on period and the switching-off period through control, and then the waveform of the output current of the windings can be translated to realize the purpose to control the average output current of the windings; at the moment, the thrust compensation effect diagram of the main windings and the secondary windings is shown in FIG. 9.

Figure 10A:
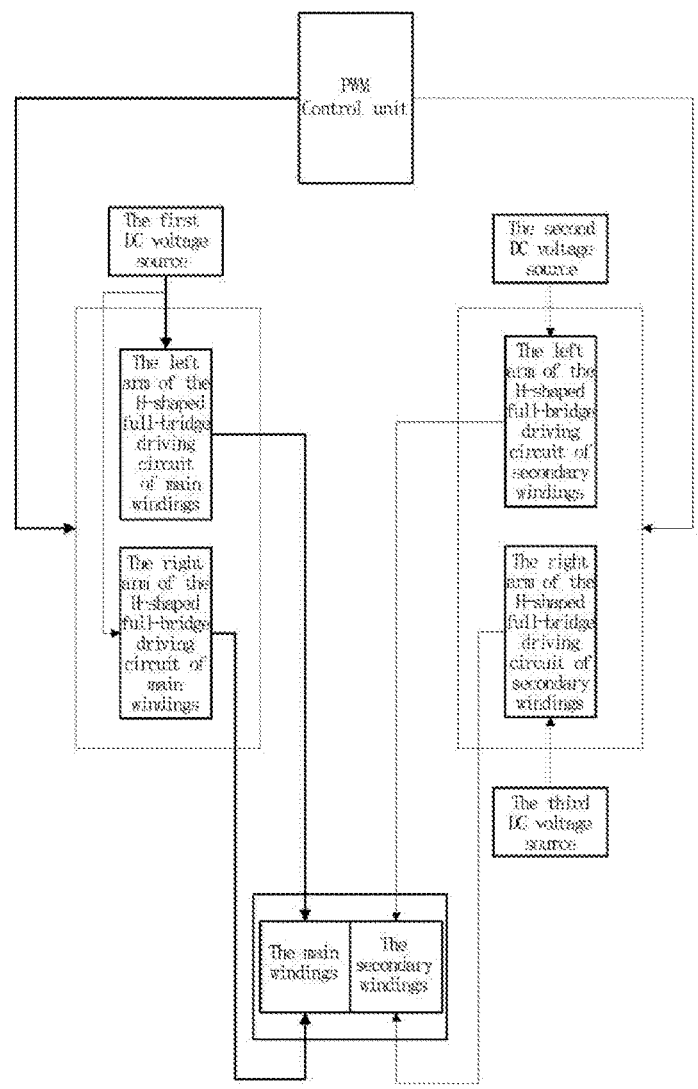
FIG. 10A is a structure diagram of the improved dual-winding thrust compensation system based on the embodiment 1 of the invention.
Figure 10B:
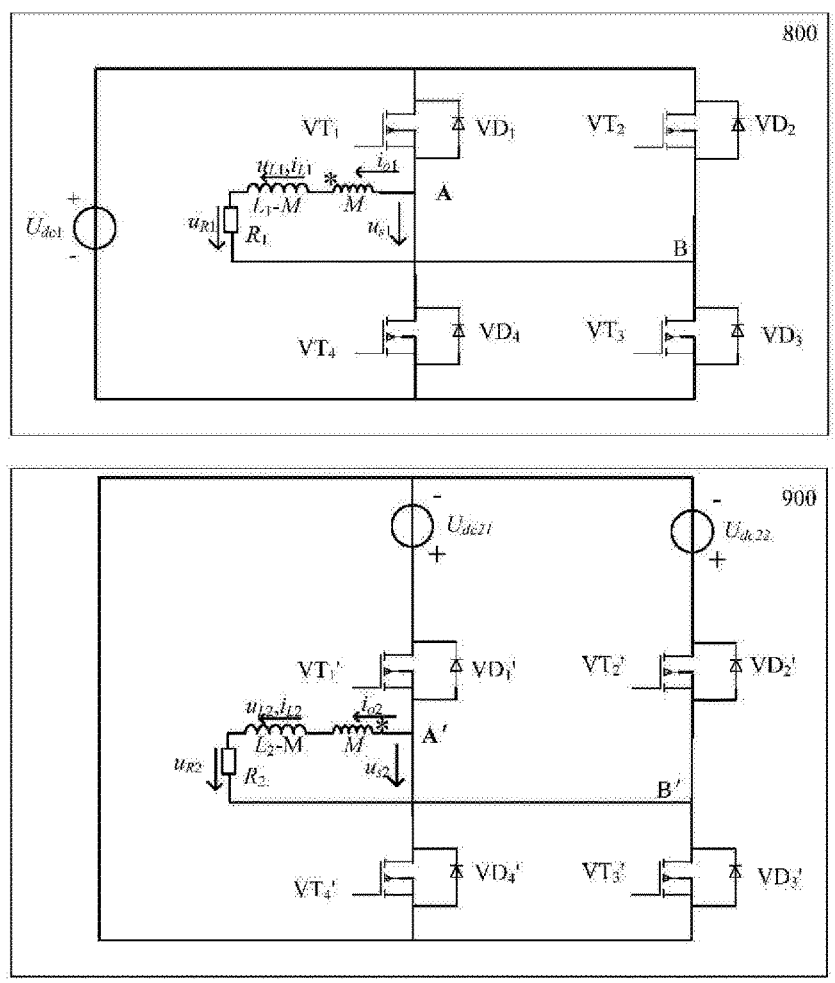
FIG. 10B shows a structure sketch of the improved dual-winding thrust compensation system based on the embodiment 1 of the invention.
Figure 12:
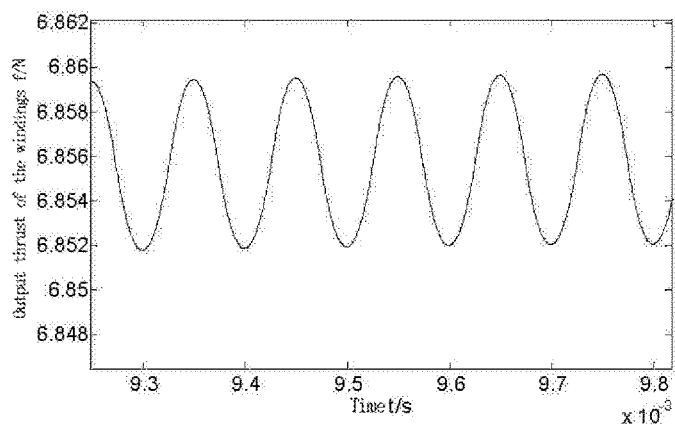
FIG. 12 is a partial enlarged view of the simulation waveform of the output thrust of the improved dual-winding system based on the embodiment 1 of the invention.
Figure 11A:
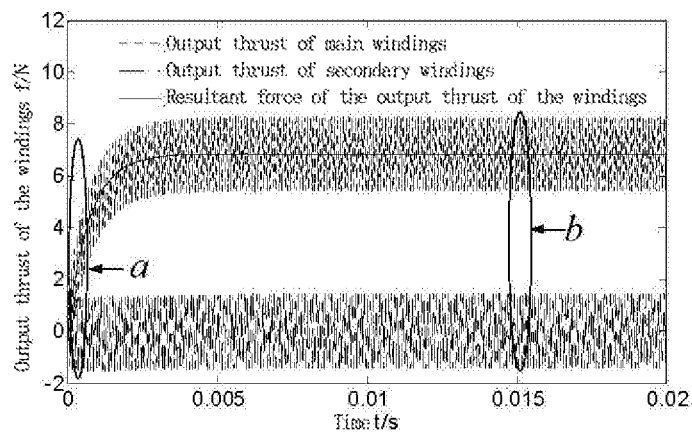
FIG. 11A through FIG. 11C are simulation waveform diagrams of the output thrust of the improved dual-winding system based on the embodiment 1 of the invention, wherein 11A is an overall result diagram of the output thrust simulation of the system, 11B is a partial enlarged view of the simulation results of the output thrust of the system between 0 and 0.001 s, and 11C is the partial enlarged view of the simulation results of the output thrust of the system between 0.015 s and 0.016 s.
Figure 11B:
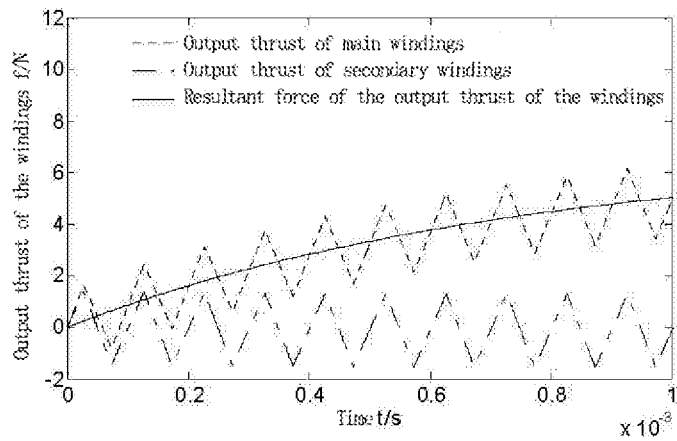

In accordance with the design requirements of the invention, the embodiment adopts the improved H-shaped dual-power full-bridge drive circuit as the drive circuits of the windings to create a new dual-winding thrust compensation system, and the structure sketch of the system is shown in FIG. 10.

As shown in FIG. 10, the drive circuit 900 of the secondary windings adopts the improved H-shaped dual-power full-bridge drive circuit, the two set of the drive circuits 800, 900 of the main windings and the secondary windings adopt the semiconductor power devices which are completely the same; at the same time, the drive signals of the semiconductor power devices are completely the same, so that the drive circuits of the main windings and the secondary windings can be synchronously switched on and off, namely the output thrust of the main windings and the output thrust of the secondary windings can be ascended and descended synchronously.

According to the analysis above, in the condition that the current ripple of the secondary windings produced by the chopped wave of the switch (abbreviated as current ripple hereinafter) is not changed, the average current value of the secondary windings (abbreviated as average current value hereinafter) within one switching on-off period can be adjusted by adjusting the voltage values $U_{dc21}$ and $U_{dc22}$ of the two power supplies in the drive circuits of the secondary windings. When the average current value of the secondary windings is adjusted to zero, the average output thrust of the secondary windings is zero, namely the secondary windings only compensate the thrust ripple of the main windings, at the same time, the average output thrust of the main windings cannot be influenced.

Besides, in the embodiment, when the improved dual-winding thrust compensation system is in the switching-on period, the current of the secondary windings is ascended (or descended) under the control of the power supply $U_{dc21}$, and when the system in the switching-off period, the current of the secondary winding is changed oppositely under the control of the power supply $U_{dc22}$, namely descended (or ascended). Therefore, to ensure that the current ripple of the secondary winding is not changed, the sum of the voltages of the two power supplies of the drive circuits of the secondary windings cannot be changed. Namely $$U_{dc21}+U_{dc22}=\text{const} \qquad \text{Formula 1.1}$$

But the difference of the voltage values of the two power supplies of the drive circuits 900 of the secondary windings influences the average current of the secondary windings, so in the condition that the current ripple of the secondary windings are not changed, the average current of the secondary windings can be adjusted to zero by adjusting the difference of the voltage values of the two power supplies of the drive circuits of the secondary windings.

After solving the state differential equations of the dual-winding thrust compensation system in the embodiment, when the resistance of the secondary windings and the voltages of the drive circuits meet the following requirements:

$$\begin{cases} R_2 = R_1 \dfrac{L_2 + \dfrac{K_{f2}}{K_{f1}}M}{L_1 + \dfrac{K_{f1}}{K_{f2}}M} \\ U_{dc21} = (2-2D)\dfrac{\dfrac{K_{f1}}{K_{f2}} \cdot L_2 + M}{L_1 + \dfrac{K_{f1}}{K_{f2}} \cdot M} U_{dc1} \\ U_{dc22} = 2D\dfrac{\dfrac{K_{f1}}{K_{f2}} \cdot L_2 + M}{L_1 + \dfrac{K_{f1}}{K_{f2}} \cdot M} U_{dc1} \end{cases} \qquad \text{Formula 1.2}$$

wherein $U_{dc1}$ stands for the first left bridge arms and the first right bridge arms, namely the voltage value of the first DC voltage source;

$U_{dc21}$ stands for the second left bridge arm, namely the voltage value of the second DC voltage source;

$U_{dc22}$ stands for the second right bridge arm, namely the voltage value of the third DC voltage source;

$R_1$ stands for the resistance of the main windings;

$R_2$ stands for the resistance of the secondary windings;

$L_1$ stands for the inductance of the main windings;

$L_2$ stands for the inductance of the secondary windings;

M stands for the mutual inductance between the main windings and the secondary windings;

$K_{f1}$ stands for the thrust coefficient of the main windings;

$K_{f2}$ stands for the thrust coefficient of the secondary windings;

D stands for the duty ratio of the switch of the dual power drive circuit.

At this moment, the secondary windings can compensate the thrust ripple of the main windings at any time, and the average output thrust of the main windings cannot be influenced.

When the drive circuit of the system adopts the 10 kHz switching frequency of the servo system, the simulation waveform of the output thrust of the system in the embodiment is shown in FIG. 11A through FIG. 18C.

As shown in the simulation waveform diagrams, the output thrust of the secondary windings can effectively compensate the output thrust of the main windings, at the same time, the average output thrust of the secondary windings basically remains at zero, and the influence of the output thrust of the main windings applied by the average output thrust of the secondary windings is reduced. At the same time, as shown in the partial enlarged view FIG. 12, the output thrust of the main windings is 8.2733 N-5.4372 N, the fluctuation value of the output thrust of the main windings is 2.8361 N, and the average output thrust of the main windings is 6.8553 N. The resultant force of the output thrust of the dual winding system is 6.8597 N-6.8521 N, the fluctuation range of the average output thrust is 7.6 mN, the average value of the resultant force of the output thrust is 6.8559 N, if the preset performance target can be met, the thrust ripple is reduced for 99.73%, the average value of the output thrust of the windings is not influenced, and the simulation results verify the accuracy and rationality of the design.

Figure 13A:
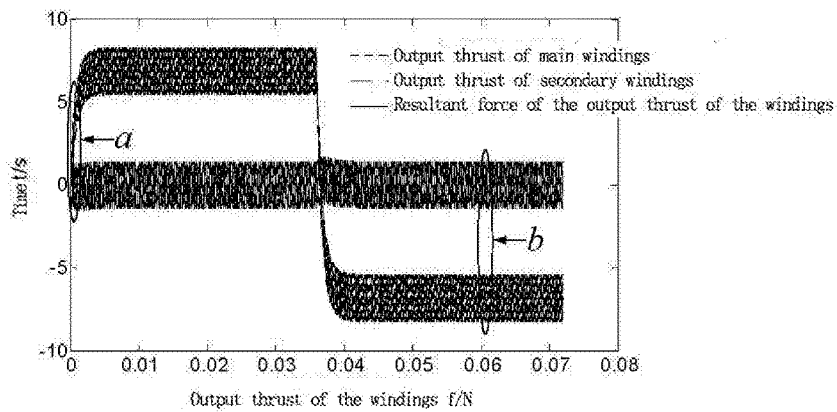
FIG. 13A through FIG. 13C are simulation waveform diagrams of the output thrust of the improved dual-winding thrust compensation system based on the variable duty ratio, wherein 13A is an overall result diagram of the output thrust simulation of the system, 13B is a partial enlarged view of the simulation results of the output thrust of the system between 0 and 0.001 s, and 13C is the partial enlarged view of the simulation results of the output thrust of the system between 0.06 s and 0.061 s.
Figure 13B:
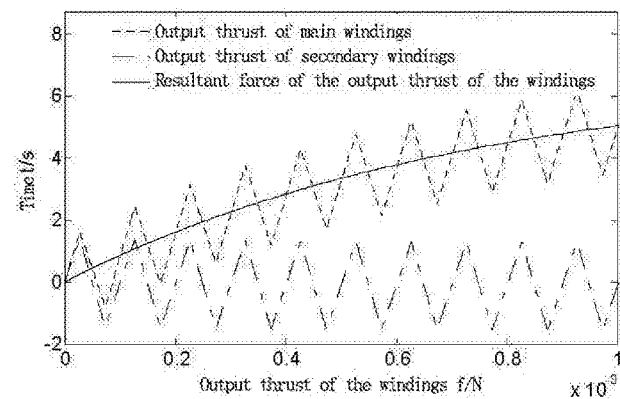
Figure 13C:
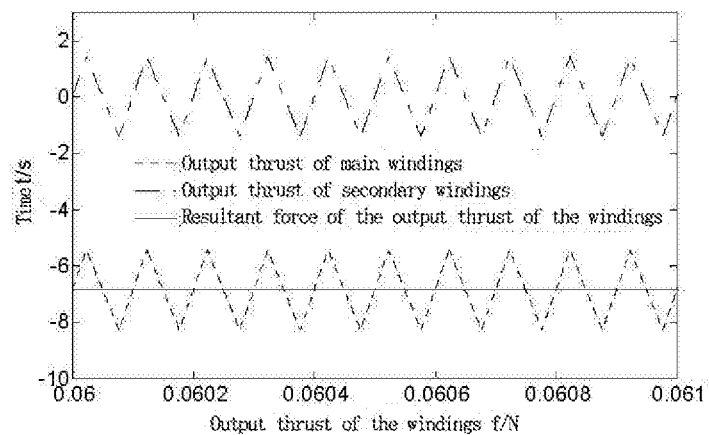

The simulation test is carried out for the working performance of the dual-winding thrust compensation system under the variable duty ratio to verify the fast response ability of the system and the dynamic thrust compensation effect. The simulation results of the output thrust of the system are shown in FIG. 13A through FIG. 13C.

Figure 14:
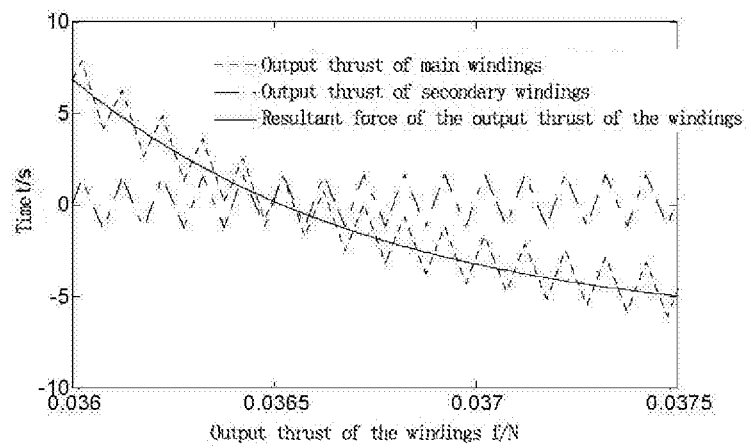
FIG. 14 is a partial enlarged view of the simulation waveform of the output thrust of the system based on the variable duty ratio.

As shown in the simulation waveform diagrams, in the condition of variable duty ratio, the secondary windings can quickly track the changes of the output thrust of the main windings; the response speed of the output thrust of the windings are mainly limited by the electrical time constant, at the same time, as shown in the partial enlarged view FIG. 14, the fluctuation value of the resultant force of the output thrust of the dual-winding system is still limited within the specified range during the changing process, and the fluctuation value of the resultant force of the output thrust of the main windings and the secondary windings is reduced during the process that the output thrust of the windings is reduced.

Figure 15:
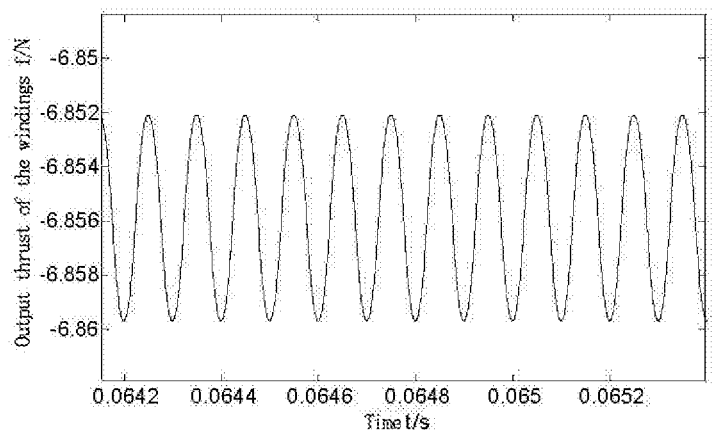
FIG. 15 is a partial enlarged view of the steady state simulation waveform of the output thrust of the system based on the variable duty ratio.

At the same time, as shown in the partial enlarged view FIG. 15, the steady state tracking performance is good after the system is adjusted, the output thrust of the main windings in the variable duty ratio simulation test is −5.4372 N~−8.2733 N, the fluctuation value of the output thrust of the main windings is 2.8361 N, and the average output thrust of the main windings is −6.8553 N. The resultant force of the output thrust of the dual winding system is −6.8521 N~−6.8597 N, the fluctuation range of the average output thrust is 7.6 mN, the average value of the resultant force of the output thrust is −6.8559 N, if the preset performance target can be met, the thrust ripple is reduced for 99.73%, the average value of the output thrust of the windings is not influenced, and the simulation results verify that dual-winding thrust compensation system in the embodiment has good dynamic thrust ripple compensation ability and good dynamic response ability.

Figure 16:
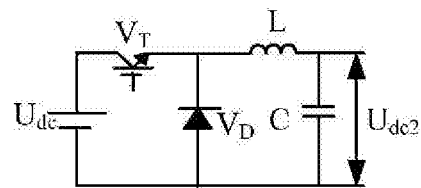
FIG. 16 is a structure sketch of the Buck DC chopper circuit.
Figure 11C:
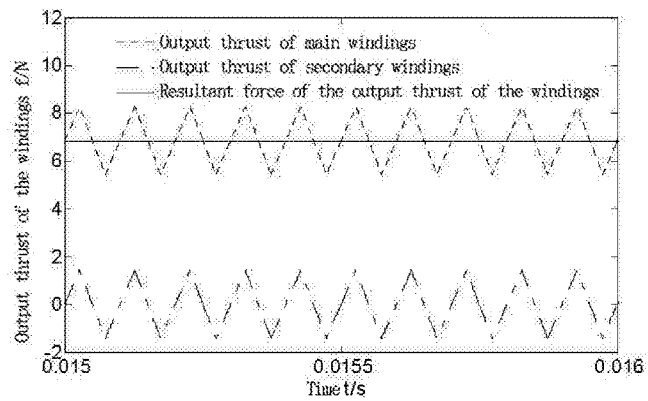

In the actual system, the controllable power supplies $U_{dc21}$ and $U_{dc22}$ of the drive circuits 900 of the secondary windings are obtained through the Buck DC chopper control circuit which is called Buck circuit for short, and the structure sketch of the Buck DC chopper control circuit is shown in FIG. 16.

As shown in FIG. 16, the Buck DC chopper circuit realizes the accurate voltage regulation by controlling the accurate chopper wave of the switch VT. The Buck DC output voltage which has high steady state voltage output capability and good fast response performance can be obtained by improving the switching frequency of the switch of the Buck DC chopper circuit and adjusting the parameter matching relationship of the inductance L to the capacitance C.

Figure 17:
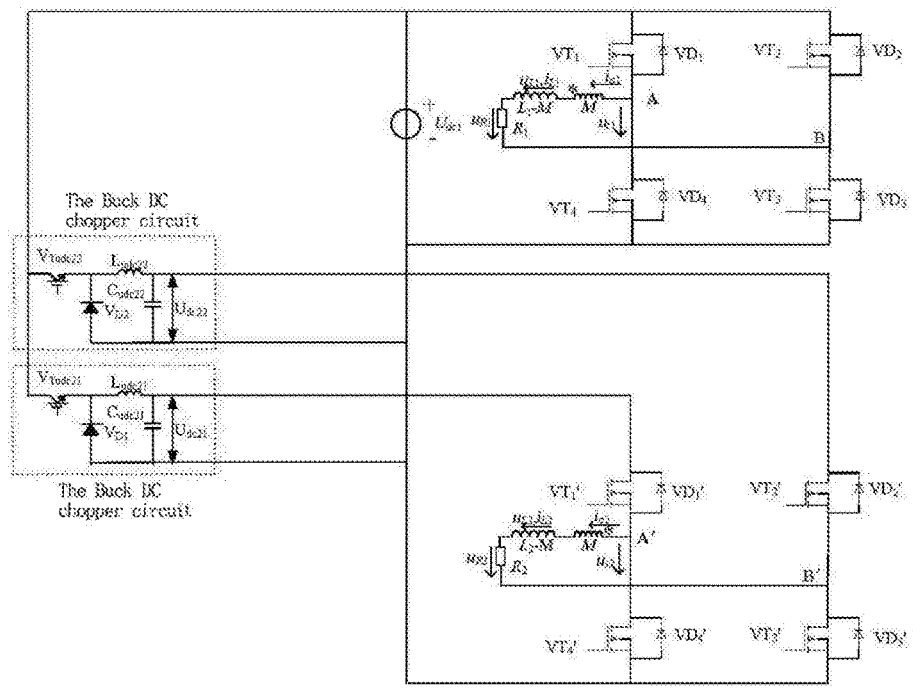
FIG. 17 is a structure sketch of the dual-winding thrust compensation system adopting the Buck DC chopper circuit as the control power supply.

FIG. 17 is a structure sketch of the dual-winding thrust compensation system adopting the Buck DC chopper circuit as the control power supply of the drive circuit of the secondary windings.

As shown in FIG. 17, the Buck circuit 1 and the Buck circuit 2 respectively replace the functions of $U_{dc21}$ and $U_{dc22}$ in the original circuit structure. At the same time, seen from the former theoretical analysis, the simulation test results of the system under the constant duty ratio and the variable duty ratio, the output current of the secondary windings within one switching-on and off period basically remains at zero, so that the requirements of the switch VT, the inductance L and the capacitance C of the Buck DC chopper circuit are reduced greatly, the chopper frequency of the switch of the Buck circuit is effectively and easily improved in the condition that the Buck circuit design structure and the parameter matching relationship are not changed, and then better control performance can be obtained in the system.

Figure 18A:
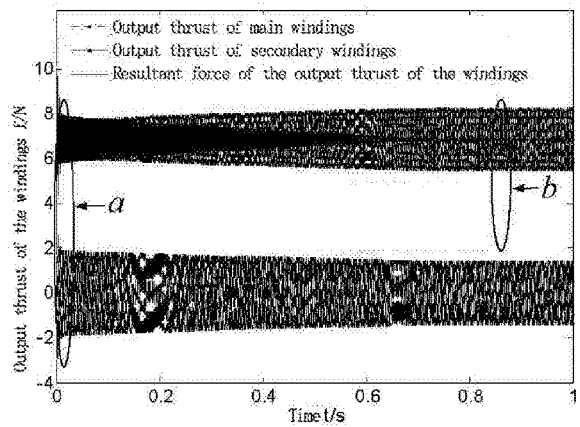
FIG. 18A through FIG. 18C are thrust simulation waveform diagrams of the dual-winding thrust compensation system, wherein 18A is an overall result diagram of the output thrust simulation of the system, 18B is a partial enlarged view of the simulation results of the output thrust of the system between 0 and 0.001 s, and 18C is the partial enlarged view of the simulation results of the output thrust of the system between 0.085 s and 0.086 s.
Figure 18B:
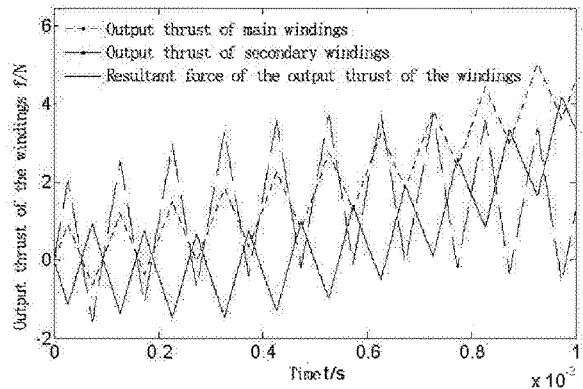
Figure 18C:
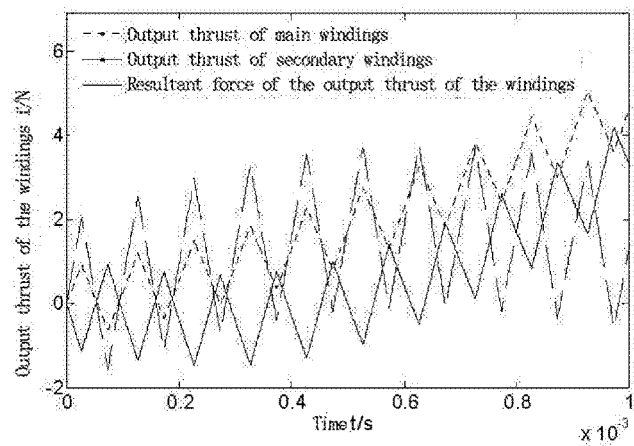

The simulation analysis is carried out for the control performance of the circuit when the control power supply of the secondary windings adopts the Buck DC buck chopper circuit in the actual system, and the simulation results of the output thrust of the system are shown FIG. 18A through FIG. 18C.

Seen from the simulation results, in the actual working condition, when the Buck DC chopper control circuit is adopted as the source of the controlled voltage of the drive circuits 900 of the secondary windings, the system can still perfectly realize the purpose to compensate the thrust by the secondary windings.

Figure 19A:
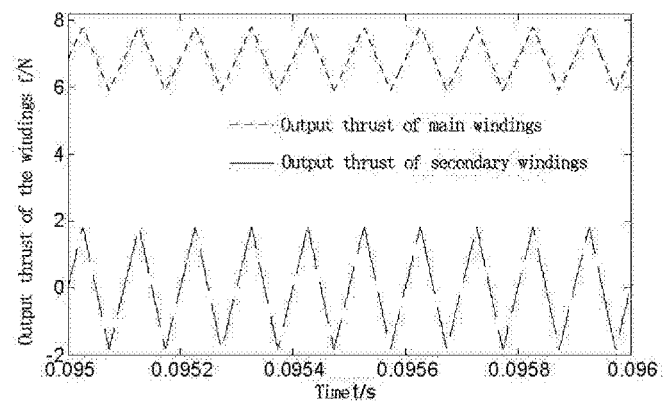
FIG. 19A is a partial enlarged view of the output thrust of the main windings and the secondary windings.
Figure 19B:
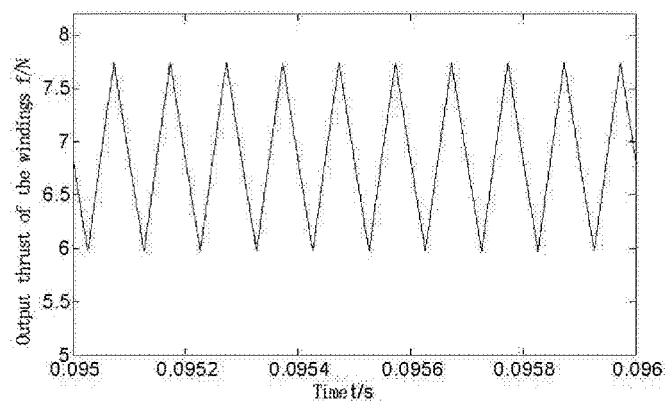
FIG. 19B is a partial enlarged view of the resultant force of the output thrust of the windings.

As shown in the simulation waveform diagrams, when the transister voltage drop of the semiconductor and the influence of the working performance of the Buck circuit applied by the charging and discharging process of the inductor and the capacitor in the Buck circuit are considered, the dual-winding thrust compensation system can perfectly compensate the output thrust of the main windings after the duty ratio of the Buck circuit is precisely designed. Seen from the partial enlarged views FIG. 19A and FIG. 19B, the output thrust range of the main windings is 8.2682 N-5.4272 N, the peak-to-peak value of the output thrust ripple of the main windings is 2.841 N, the average output thrust of the main windings is 6.8477 N, the resultant force of the output thrust of the dual-winding compensation system is 6.8892 N-6.809 N after compensated by the secondary windings, the peak-to-peak value of the fluctuation of the resultant force of the output thrust of the system is 0.0802 N, the average value of the output thrust is 6.8491, the output thrust ripple of the winding is reduced 97.17%, at the same time, the average value of the output thrust of the winding is not reduced, so the design target of the scheme in the invention is realized.

Embodiment 2

Seen from the former narration, when the secondary windings adopt the dual-power full-bridge drive circuits, and the drive circuits of the main windings and the secondary windings adopt the same on-off chopper wave signal, the secondary windings can compensate the thrust ripple of the main windings at any time by adjusting the voltage values of the two power supplies of the dual-power drive circuits of the secondary windings, at the same time, the average output thrust of the secondary is zero, so the average output thrust of the main windings is not influenced; but in the actual working condition, when the controlled power supplies of the drive circuits of the secondary windings are obtained from the Buck DC chopper circuit, because of the working performance limitation of the Buck chopper circuit in the actual condition, the thrust ripple compensation effect is reduced, and the dynamic response ability of the motor is influenced; when the main windings adopt the dual-power full-bridge drive circuits, in the condition of the output thrust ripple of the smaller winding, the average output thrust of the main windings can be adjusted by adjusting the voltage values of the two power suppliers of the dual-power drive circuits, but when only the main windings adopt the dual-power full-bridge drive circuits, in the condition that the output thrust ripple of the system is very small, the average output thrust range of the system is limited.

When the servo system of the voice coil motor applies to the ultra-high precision servo system, to obtain the smallest output thrust ripple of the system and the best system control performance in the actual working condition, the main windings and the secondary windings can adopt the dual-power drive circuits to control the main windings, so that the output thrust ripple of the main windings is reduced, and then the servo system of the voice coil motor obtains the smallest thrust ripple through compensating the thrust ripple of the main windings by the secondary windings, namely the controlled power circuits of the dual-power circuits of the main windings and the secondary windings can be adjusted, so that the main windings and the secondary windings can work in the best matching condition in actual work, and the smallest output thrust ripple can be obtained in the system.

Figure 20A:
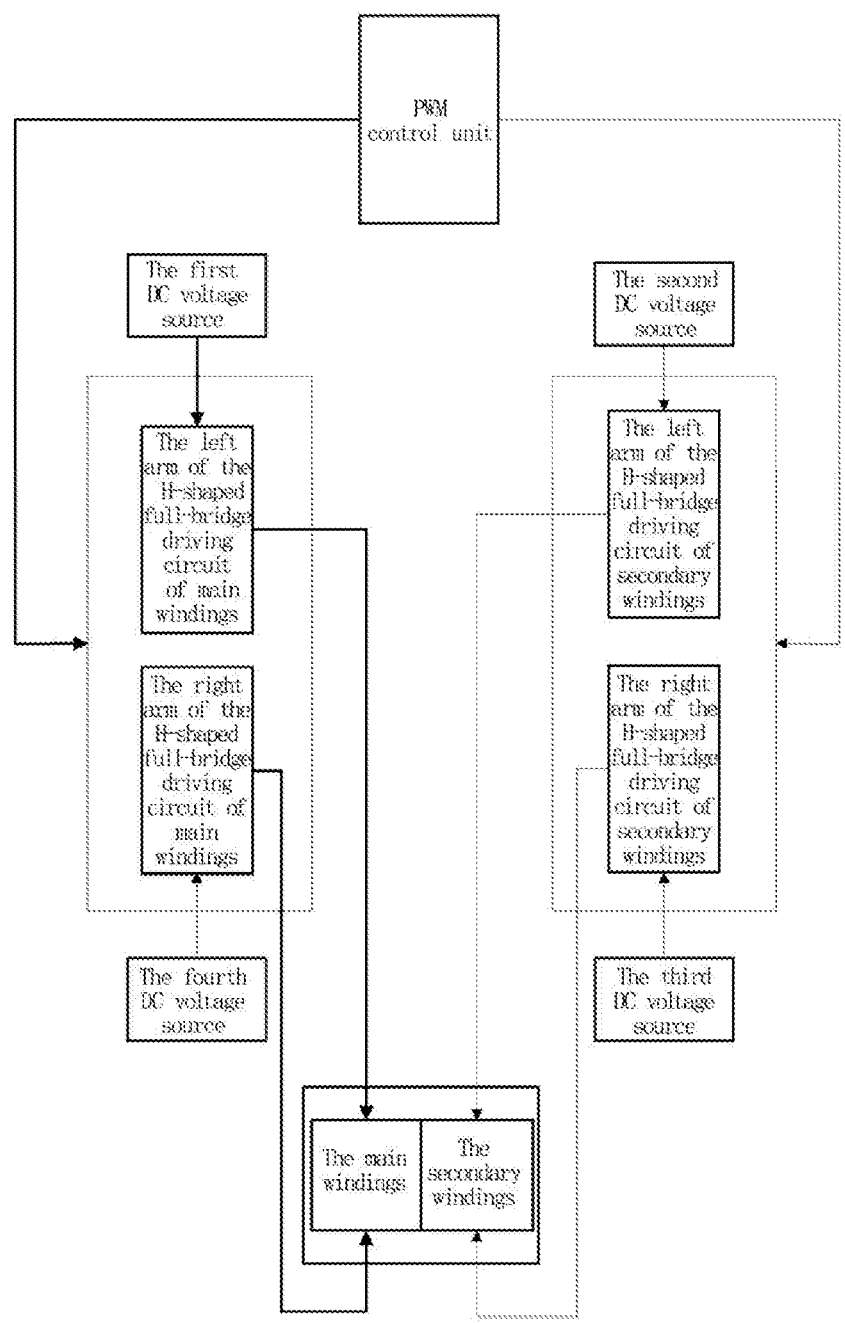
FIG. 20A is a structure diagram of the improved dual-winding thrust compensation system based on the embodiment 2 of the invention.
Figure 20B:
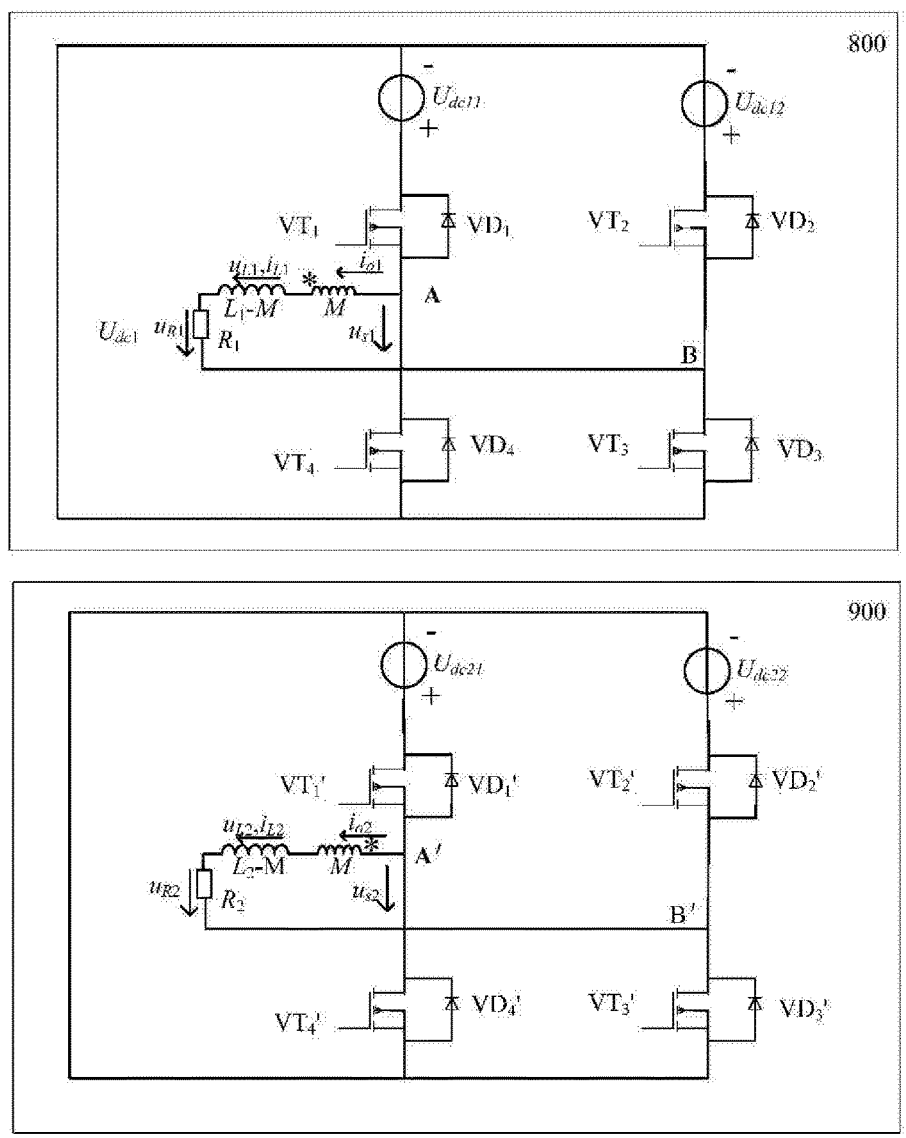
FIG. 20B is a structure sketch of the improved dual-winding thrust compensation system based on the embodiment 2 of the invention.

The structure sketch of the improved dual-winding thrust compensation system based on the embodiment 2 of the invention is shown in FIG. 20A and FIG. 20B.

As shown in FIG. 20A and FIG. 20B, in the embodiment, the main windings and the secondary windings adopt the improved dual-power full-bridge drive circuits. At the moment, the output thrust ripple of the main windings can be reduced by adjusting the voltage values $U_{dc11}$ and $U_{dc12}$ of the drive voltage sources of the drive circuits of the main windings; the output thrust ripple of the main windings can be compensated by the secondary windings through controlling the voltage values of the two voltage sources $U_{dc21}$ and $U_{dc22}$ of the drive circuits of the secondary windings, the average output thrust of the secondary windings is zero, and the influence of the average output thrust of the main windings applied by the secondary windings can be eliminated. When the servo system adjusts the average output thrust thereof by adjusting the duty ratio, the stability of the output thrust of the system can be enhanced during the dynamic process by adjusting the drive circuits of the main windings and the drive circuits of the secondary windings at the same time, then the adjusting rapidity of the output thrust of the system is increased, and the dynamic response ability of the system is improved. At the same time, during the actual application process, the controlled voltage sources $U_{dc11}$, $U_{dc12}$, $U_{dc21}$ and $U_{dc22}$ of the main windings and the secondary windings in the embodiment are realized by uniformly adopting a same power modulation form, for example, adopting the Buck DC chopper circuit to realize, then further reduce the output thrust ripple of the system caused by the voltage ripple during the modulation process of the controlled power supplies and then further reduce the output thrust ripple of the system.

At the moment, the voltage values of the controlled voltage sources of the drive circuits of the main windings and the secondary windings in the embodiment and the resistance values of the secondary windings can be designed according to the method below.

$$\begin{cases} U_{dc11} = \frac{R_1}{\alpha \cdot K_{f1}} \frac{\left(F_{max} \cdot D_{max} + F_{min} \cdot D_{min} - 2F_{max} \cdot D_{min}\right)}{(D_{max} - D_{min})} \\ U_{dc12} = \frac{R_1}{\alpha \cdot K_{f1}} \frac{(F_{max} \cdot D_{min} - F_{min} \cdot D_{max})}{(D_{max} - D_{min})} \\ R_2 = R_1 \frac{L_2 + \frac{K_{f2}}{K_{f1}} \cdot M}{L_1 + \frac{K_{f1}}{K_{f2}} \cdot M} \\ U_{dc21} = \frac{(1-D) \cdot R_1}{\alpha \cdot K_{f1}} \frac{\frac{K_{f1}}{K_{f2}} \cdot L_2 + M}{L_1 + \frac{K_{f1}}{K_{f2}} \cdot M} \frac{F_{max} - F_{min}}{D_{max} - D_{min}} \\ U_{dc22} = \frac{D \cdot R_1}{\alpha \cdot K_{f1}} \frac{\frac{K_{f1}}{K_{f2}} \cdot L_2 + M}{L_1 + \frac{K_{f1}}{K_{f2}} \cdot M} \frac{F_{max} - F_{min}}{D_{max} - D_{min}} \end{cases} \quad \text{Formula 1.3}$$

Figure 21A:
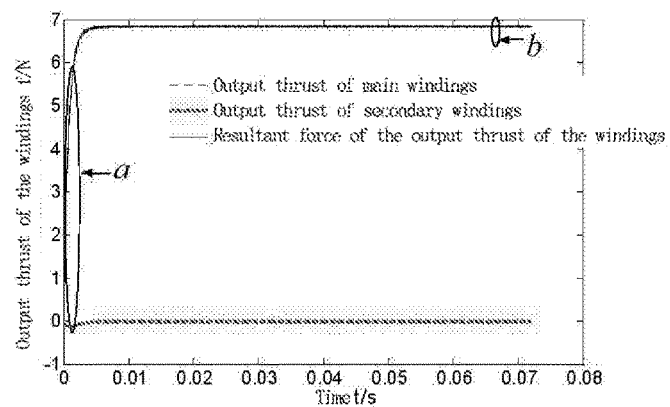
FIG. 21A through FIG. 21C are thrust simulation waveform diagrams of the dual-winding dual-power thrust compensation system based on the embodiment 2 of the invention, wherein 21A is an overall result diagram of the output thrust simulation of the system, 21B is a partial enlarged view of the simulation results of the output thrust of the system between 0 and 0.0008 s, and 21C is the partial enlarged view of the simulation results of the output thrust of the system between 0.066 s and 0.067 s.

In the formula, Udc11 stands for the voltage value of the controlled voltage source of the left bridge arm of the drive circuit of the main winding;

In the formula, Udc12 stands for the voltage value of the controlled voltage source of the right bridge arm of the drive circuit of the main winding;

In the formula, Udc21 stands for the voltage value of the controlled voltage source of the left bridge arm of the drive circuit of the secondary winding;

Udc22 stands for the voltage value of the controlled voltage source of the right bridge arm of the drive circuit of the secondary winding;

$R_1$ stands for the resistance of the main windings;
$R_2$ stands for the resistance of the secondary windings;
$L_1$ stands for the inductance of the main windings;
$L_2$ stands for the inductance of the secondary windings;
M stands for the mutual inductance between the main windings and the secondary windings;
$K_{f1}$ stands for the thrust coefficient of the main windings;
$K_{f2}$ stands for the thrust coefficient of the secondary windings;
$F_{max}$ stands for the maximum positive average thrust required by the servo system within one switch cycle;
$F_{min}$ stands for the maximum negative average thrust required by the servo system within one switch cycle;
$D_{max}$ stands for the maximum duty ratio of the full-bridge drive circuit having the main windings and the dual power in the condition of considering the dead space of the switch;
$D_{max}$ stands for the minimum duty ratio of the full-bridge drive circuit having the main windings and the dual power in the condition of considering the dead space of the switch;

α stands for the margin coefficient reserved for fully meeting the system thrust requirements by the output thrust of the main windings, 0<α<1;

The accuracy and rationality of the theoretical analysis are verified through the simulation test; when the voice coil motor, the switching signal and the switching frequency are the same as that in the simulation test in the embodiment 1, the simulation waveform of the output thrust of the system is shown in FIG. 21.

Figure 21B:
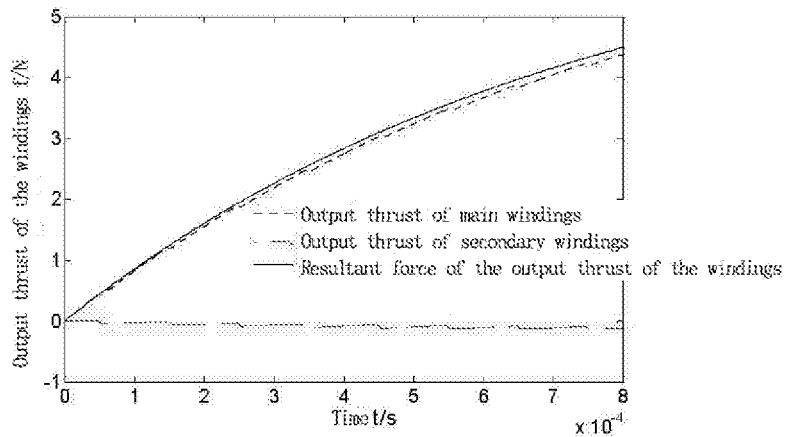
Figure 21C:
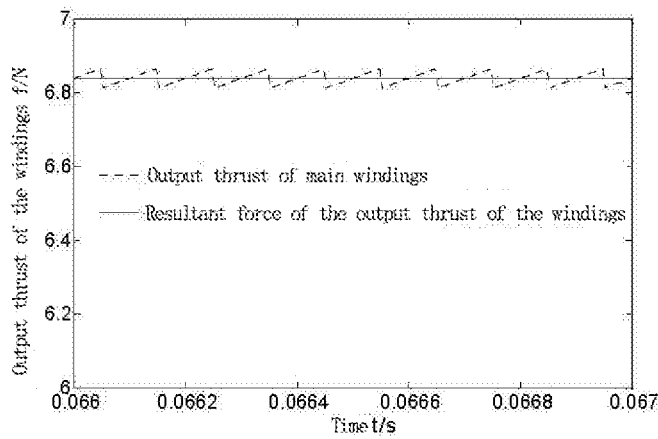
Figure 23:
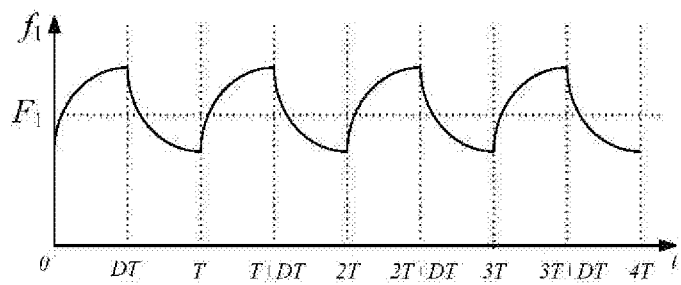
FIG. 23 is an output thrust change waveform diagram of the main windings under the influence of the on-off chopper wave of the switch.

Seen from the simulation waveform diagram, after the main windings and the secondary windings adopt the dual-power circuit to design, the fluctuation of the resultant force of the output thrust of the windings of the ultra-high precision servo control system having dual windings is further reduced; as shown in the partial enlarged view FIG. 21B, during the steady state adjusting process, the fluctuation of the resultant force of the output thrust of the windings is further reduced by matching the two controlled voltage sources of the dual-power drive control circuits of the main windings and the secondary windings, and the steady state characteristics are good. At the same time, as shown in the partial enlarged view FIG. 21C, in the steady state condition, the output thrust ripple range of the main windings is 6.8627 N-6.8112 N, the fluctuation quantity of the output thrust of the main windings within one switching-on and off period is 0.0515 N, the average output thrust is 6.8370 N, the steady state fluctuation range of the resultant force of the output thrust of the main windings and the secondary windings is 6.8372 N-6.8371 N, the fluctuation quantity of the resultant force of the output thrust of the windings within one switching-on and off period is 0.0001 N, and the average thrust of the output resultant force is 6.83715 N. Compared with the traditional H-shaped single-winding full-bridge drive circuit scheme, the output thrust ripple quantity of the system is reduced to 0.00157% of original; compared with the scheme that only the secondary windings adopt the dual-power structure in the embodiment 2, the fluctuation quantity of the resultant force of the output thrust of the system is reduced to 1.316% of original. The simulation test verifies the accuracy and rationality of the theoretical analysis, if the main windings and the secondary windings adopt the dual-power drive scheme, the output thrust ripple quantity of the ultra-high precision servo system of the voice coil motor can be further reduced, so that better servo drive performance can be obtained in the system.

Figure 22:
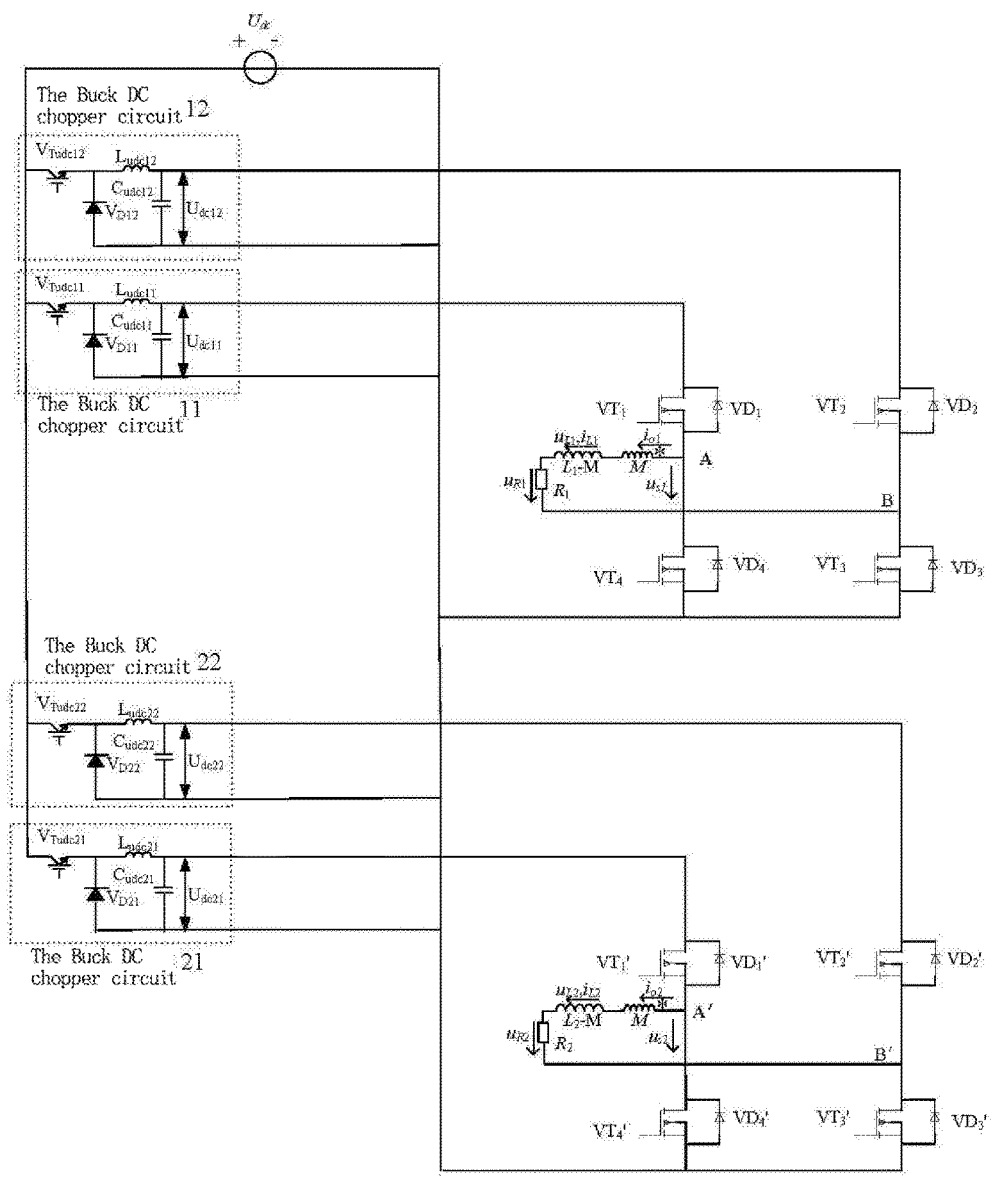
FIG. 22 is a structure sketch of the system driven by the Buck circuit based on the embodiment 2 of the invention.
Figure 24:
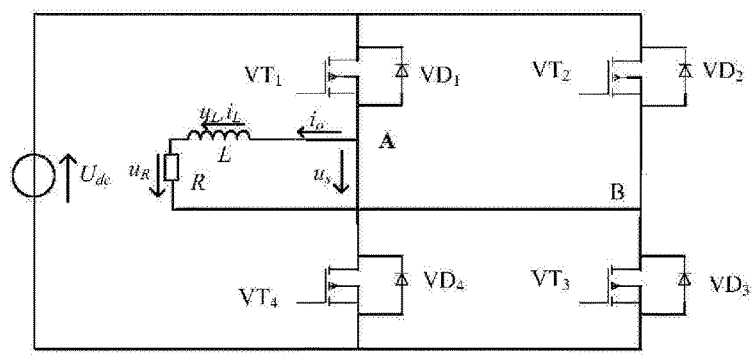
FIG. 24 is the structure sketch of the original H-shaped full-bridge circuit.
Figure 25A:
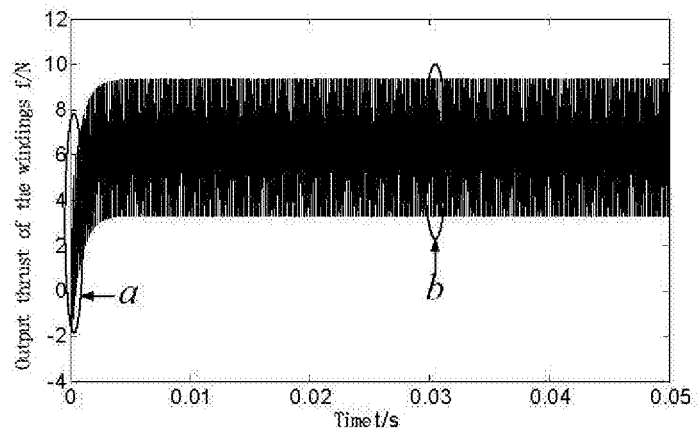
FIG. 25A through FIG. 25C are simulation diagrams of the output thrust of the servo drive system of the original voice coil motor below 10 kHz, wherein 25A is an overall result diagram of the output thrust simulation of the system, 25B is a partial enlarged view of the simulation results of the output thrust of the system between 0 and 0.001 s, and 25C is the partial enlarged view of the simulation results of the output thrust of the system between 0.03 s and 0.031 s.
Figure 25B:
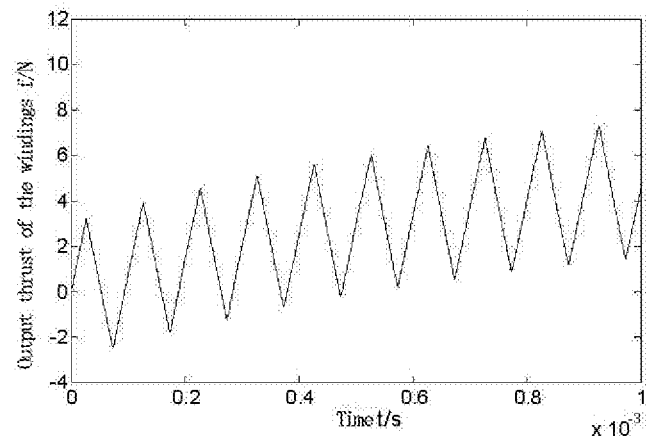
Figure 25C:
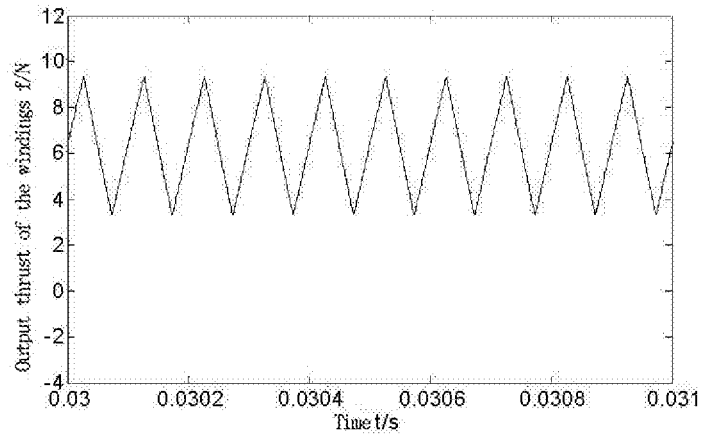
Figure 26A:
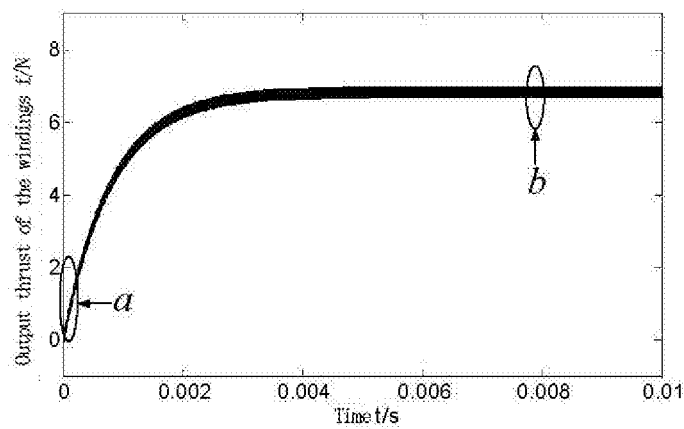
FIG. 26 A through FIG. 26C are simulation diagrams of the output thrust of the servo drive system of the original voice coil motor below 200 kHz, wherein 26A is an overall result diagram of the output thrust simulation of the system, 26B is a partial enlarged view of the simulation results of the output thrust of the system between 0 and 0.0002 s, and 25C is the partial enlarged view of the simulation results of the output thrust of the system between 0.008 s and 0.0082 s.
Figure 26B:
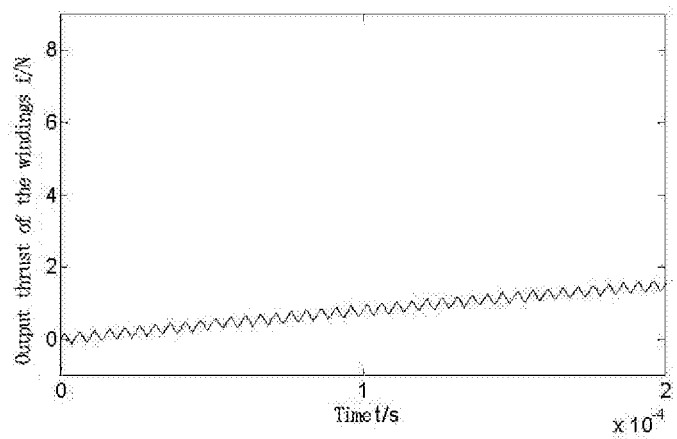
Figure 26C:
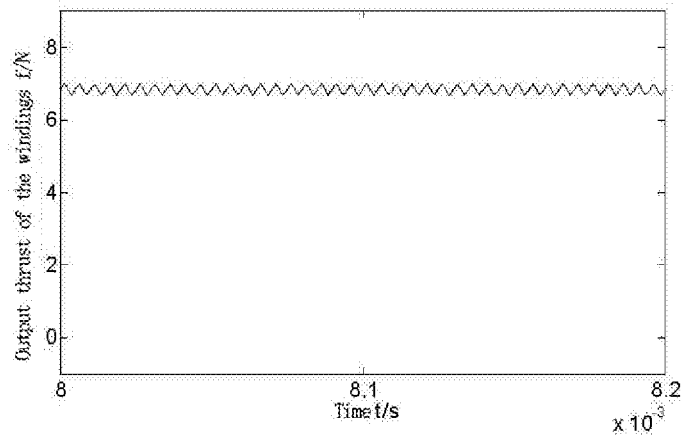

But in the actual system, if the Buck circuit is adopted as the control power of the drive circuits of the main windings and the secondary windings, the structure sketch of the servo system of the voice coil motor in the embodiment is shown in FIG. 22.

As shown in FIG. 22, the power supplies of the dual-power drive circuits of the main windings and the secondary windings are obtained through the Buck DC chopper circuit; in the steady state condition, the smallest output thrust ripple can be obtained in the system by designing the parameters of the Buck DC chopper circuit, and then the influence of the output thrust ripple of the system applied by the switching chopper wave of the switch of the Buck circuit can be reduced in the actual work; during the dynamic adjusting process, the thrust ripple of the system can be reduced by adjusting the Buck circuits of the drive circuits of the main windings and the secondary windings at the same time, and then the dynamic response ability of the average output thrust can be improved.

Except for the Buck DC chopper circuit claimed above, we should understand that the power suppliers of the drive circuits of the main windings and the secondary windings can be obtained through the Boost DC chopper circuit or the Buck-Boost chopper circuit.

In conclusion, the embodiments are the better ones in this invention only, and not used to limit the implementation scope of the invention. All changes and decorations done within the patent application scope belong to the technical field of the invention.

The invention claimed is:
1. A thrust compensation system comprising:
a first H-shaped full-bridge drive circuit that is connected to main windings of a voice coil motor, including first left bridge arms of a first field-effect transistor and a fourth field-effect transistor connected in series and first right bridge arms of a second field-effect transistor and a third field-effect transistor connected in series;
a first PWM control unit for providing a control signal for the field-effect transistors of the first left bridge arms and the first right bridge arms;
a first DC (direct current) voltage source providing power for the first left bridge arms and first right bridge arms at the same time;
a second H-shaped full-bridge drive circuit that is connected to secondary windings of a voice coil motor, including second left bridge arms of a fifth field-effect transistor and an eighth field-effect transistor connected in series and second right bridge arms of a sixth field-effect transistor and a seventh field-effect transistor connected in series;
a second PWM control unit for providing a control signal for the field-effect transistors of the second left bridge arms and the second right bridge arms;
a second DC voltage source providing power for the second left bridge arms; and
a third DC voltage source providing power for the second right bridge arms at the same time as the second DC voltage source;
wherein the second DC voltage source and the third DC voltage source are configured as:

$$\begin{cases} R_2 = R_1 \dfrac{L_2 + \dfrac{K_{f2}}{K_{f1}}M}{L_1 + \dfrac{K_{f1}}{K_{f2}}M} \\ U_{dc21} = (2 - 2D) \dfrac{\dfrac{K_{f1}}{K_{f2}} \cdot L_2 + M}{L_1 + \dfrac{K_{f1}}{K_{f2}} \cdot M} U_{dc1} \\ U_{dc22} = 2D \dfrac{\dfrac{K_{f1}}{K_{f2}} \cdot L_2 + M}{L_1 + \dfrac{K_{f1}}{K_{f2}} \cdot M} U_{dc1} \end{cases}$$

wherein:
$U_{dc1}$ stands for the voltage value of the first DC voltage source;
$U_{dc21}$ stands for the second left bridge arm, namely the voltage value of the second DC voltage source;
$U_{dc21}$ stands for the second right bridge arm, namely the voltage value of the third DC voltage source;
$R_1$ stands for the resistance of the main windings;
$R_2$ stands for the resistance of the secondary windings;
$L_1$ stands for the inductance of the main windings;
$L_2$ stands for the inductance of the secondary windings;

M stands for the mutual inductance between the main windings and the secondary windings;

$K_{f1}$ stands for the thrust coefficient of the main windings;

$K_{f2}$ stands for the thrust coefficient of the secondary windings; and

D stands for the duty ratio of the switch of the dual-power drive circuit.

2. The thrust compensation system of the dual-winding voice coil motor as claimed in claim 1, wherein the second DC voltage source and the third DC voltage source are are selected from the group consisting of a Buck DC chopper control circuit, a Boost DC chopper control circuit, and a Buck-Boost chopper control circuit.

3. The thrust compensation system as claimed in claim 1, being a thrust system of a dual-winding voice coil motor, which is used for driving the voice coil motor having the secondary windings arranged between each pair of the main windings, wherein the main windings are the main working windings of the voice coil motor and used for providing the output electromagnetic force required by the driving system of the voice coil motor; and wherein the secondary windings are compensation windings and used for providing the thrust ripple opposite to the main windings and compensating the thrust ripple of the main windings, so that the resultant force of the output thrust of the main windings and the secondary windings of the voice coil motor is constant.

4. The thrust compensation system of the dual-winding voice coil motor as claimed in claim 3, wherein the winding forms of the main windings and the second windings of the voice coil motor are layered type or joint filling type.

5. The thrust compensation system of the dual-winding voice coil motor as claimed in claim 4, wherein the secondary windings are enclosed between the two layers of the main windings, and the main windings at the internal side are enclosed on the external layer of the winding pillar.

6. The thrust compensation system of the dual-winding voice coil motor module as claimed in claim 3, wherein the main windings, the secondary windings and the winding pillar are encapsulated in a primary winding support plate through epoxy glue;

wherein the primary winding support plate is supported through a primary support pedestal; and wherein a secondary magnetic steel is connected with a secondary support structure through a yoke plate.

7. The thrust compensation system of the dual-winding voice coil motor as claimed in claim 4, wherein the secondary windings are clamped between the upper main winding and the lower main winding, and the winding pillar passes through the upper main winding, the secondary winding and the lower main winding from upside to downside.

8. A thrust compensation system of a dual-winding voice coil motor, which is used for driving the voice coil motor having the secondary windings arranged between each pair of the main windings, wherein the main windings are the main working windings of the voice coil motor and used for providing the output electromagnetic force required by the driving system of the voice coil motor, the secondary windings are compensation windings and used for providing the thrust ripple opposite to the main windings and compensating the thrust ripple of the main windings, so that the resultant force of the output thrust of the main windings and the secondary windings of the voice coil motor is constant, wherein the thrust compensation system comprises:

a first H-shaped full-bridge drive circuit which is connected to the main windings of the voice coil motor, including the first left bridge arms of a first field-effect transistor and a fourth field-effect transistor connected in series and the first right bridge arms of a second field-effect transistor and a third field-effect transistor connected in series;

a first PWM control unit which is used for providing the control signal for the field-effect transistors of the first left bridge arms and the first right bridge arms;

a first DC voltage source provides the power for the first left bridge arms;

a fourth DC voltage source provides the power for the first right bridge arms;

a second H-shaped full-bridge drive circuit which is connected to the secondary windings of the voice coil motor, including the second left bridge arms of a fifth field-effect transistor and an eighth field-effect transistor connected in series and the second right bridge arms of a sixth field-effect transistor and a seventh field-effect transistor connected in series;

a second PWM control unit which is used for providing the control signal for the field-effect transistors of the second left bridge arms and the second right bridge arms;

a second DC voltage source providing the power for the second left bridge arms, and a third DC voltage source providing the power for the second right bridge arms at the same time;

wherein the first DC voltage source, the second DC voltage source, the third DC voltage source and the fourth DC voltage source are configured as:

$$\begin{cases} U_{dc11} = \dfrac{R_1}{\alpha \cdot K_{f1}} \dfrac{\left(\dfrac{F_{max} \cdot D_{max} + F_{min} \cdot}{D_{min} - 2F_{max} \cdot D_{min}}\right)}{(D_{max} - D_{min})} \\[2mm] U_{dc12} = \dfrac{R_1}{\alpha \cdot K_{f1}} \dfrac{(F_{max} \cdot D_{min} - F_{min} \cdot D_{max})}{(D_{max} - D_{min})} \\[2mm] R_2 = R_1 \dfrac{L_2 + \dfrac{K_{f2}}{K_{f1}} \cdot M}{L_1 + \dfrac{K_{f1}}{K_{f2}} \cdot M} \\[2mm] U_{dc21} = \dfrac{(1-D) \cdot R_1}{\alpha \cdot K_{f1}} \dfrac{\dfrac{K_{f1}}{K_{f2}} \cdot L_2 + M}{L_1 + \dfrac{K_{f1}}{K_{f2}} \cdot M} \dfrac{F_{max} - F_{min}}{D_{max} - D_{min}} \\[2mm] U_{dc22} = \dfrac{D \cdot R_1}{\alpha \cdot K_{f1}} \dfrac{\dfrac{K_{f1}}{K_{f2}} \cdot L_2 + M}{L_1 + \dfrac{K_{f1}}{K_{f2}} \cdot M} \dfrac{F_{max} - F_{min}}{D_{max} - D_{min}} \end{cases}$$

wherein:

$U_{dc11}$ stands for the first left bridge arms, being the voltage value of the first DC voltage source;

$U_{dc12}$ stands for the first right bridge arms, namely the voltage value of the fourth DC voltage source;

$U_{dc21}$ stands for the second left bridge arms, namely the voltage value of the second DC voltage source;

$U_{dc22}$ stands for the second right bridge arm, namely the voltage value of the third DC voltage source;

$R_1$ stands for the resistance of the main windings;

$R_2$ stands for the resistance of the secondary windings;

$L_1$ stands for the inductance of the main windings;

$L_2$ stands for the inductance of the secondary windings;

M stands for the mutual inductance between the main windings and the secondary windings;

$K_{f1}$ stands for the thrust coefficient of the main windings;

$K_{f2}$ stands for the thrust coefficient of the secondary windings;

$F_{max}$ stands for the maximum positive average thrust required by the servo system within one switch cycle;

$F_{min}$ stands for the maximum negative average thrust required by the servo system within one switch cycle;

$D_{max}$ stands for the maximum duty ratio of the full-bridge drive circuit having the main windings and the dual power in the condition of considering the dead space of the switch;

$D_{max}$ stands for the minimum duty ratio of the full-bridge drive circuit having the main windings and the dual power in the condition of considering the dead space of the switch; and α stands for the margin coefficient reserved for fully meeting the system thrust requirements by the output thrust of the main windings, $0<\alpha<1$.

9. The thrust compensation system of the dual-winding voice coil motor as claimed in claim 8, wherein the first DC voltage source, the second DC voltage source, the third DC voltage source and the fourth DC voltage source are selected from the group consisting of a Buck DC chopper control circuit, Boost DC chopper control circuit, and Buck-Boost chopper control circuit.

10. The thrust compensation system of the dual-winding voice coil motor as claimed in claim 8, wherein the winding forms of the main windings and the second windings of the voice coil motor are layered type or joint filling type.

11. The thrust compensation system of the dual-winding voice coil motor as claimed in claim 10, wherein the secondary windings are enclosed between the two layers of the main windings, and the main windings at the internal side are enclosed on the external layer of the winding pillar.

12. The thrust compensation system of the dual-winding voice coil motor as claimed in claim 10, wherein the secondary windings are clamped between the upper main winding and the lower main winding, and the winding pillar passes through the upper main winding, the secondary winding and the lower main winding from upside to downside.

13. The thrust compensation system of the dual-winding voice coil motor as claimed in claim 8, wherein the main windings, the secondary windings and the winding pillar are encapsulated in a primary winding support plate through epoxy glue;

wherein the primary winding support plate is supported through a primary support pedestal; and wherein a secondary magnetic steel is connected with a secondary support structure through a yoke plate.

\* \* \* \* \*